(12) United States Patent
Chapman et al.

(10) Patent No.: US 8,737,100 B2
(45) Date of Patent: May 27, 2014

(54) METHOD AND APPARATUS FOR CONTROLLING AN INVERTER USING PULSE MODE CONTROL

(71) Applicants: Patrick L. Chapman, Austin, TX (US); Philip T. Krein, Champaign, IL (US)

(72) Inventors: Patrick L. Chapman, Austin, TX (US); Philip T. Krein, Champaign, IL (US)

(73) Assignee: SolarBridge Technologies, Inc., Austin, TX (US)

( * ) Notice: Subject to any disclaimer, the term of this patent is extended or adjusted under 35 U.S.C. 154(b) by 0 days.

(21) Appl. No.: 13/647,847

(22) Filed: Oct. 9, 2012

(65) Prior Publication Data

US 2013/0094268 A1 Apr. 18, 2013

Related U.S. Application Data

(63) Continuation of application No. 13/324,023, filed on Dec. 13, 2011, now Pat. No. 8,284,574.

(60) Provisional application No. 61/548,018, filed on Oct. 17, 2011.

(51) Int. Cl.
*H02M 7/44* (2006.01)

(52) U.S. Cl.
USPC .............................................. 363/95; 363/98

(58) Field of Classification Search
USPC ............................ 363/17, 41, 42, 132, 95, 98
See application file for complete search history.

(56) References Cited

U.S. PATENT DOCUMENTS

| | | | |
|---|---|---|---|
| 3,670,230 A | 6/1972 | Rooney et al. |
| 4,114,048 A | 9/1978 | Hull |
| 4,217,633 A | 8/1980 | Evans |
| 4,277,692 A | 7/1981 | Small |
| 4,287,465 A | 9/1981 | Godard et al. |
| 4,651,265 A | 3/1987 | Stacey et al. |
| 4,661,758 A | 4/1987 | Whittaker |
| 4,707,774 A | 11/1987 | Kajita |
| 4,709,318 A | 11/1987 | Gephart et al. |
| 4,719,550 A | 1/1988 | Powell et al. |
| 4,725,740 A | 2/1988 | Nakata |
| 5,041,959 A | 8/1991 | Walker |

(Continued)

FOREIGN PATENT DOCUMENTS

| | | |
|---|---|---|
| CA | 2353422 C | 3/2004 |
| CA | 2655007 A1 | 8/2010 |

(Continued)

OTHER PUBLICATIONS

Nikraz et al., "Digital Control of a Voltage Source Inverter in Photovoltaic Applications," 35th Annual IEEE Power Electronics Specialists Conference, pp. 3266-3271, 2004.

(Continued)

*Primary Examiner* — Jeffrey Sterrett
(74) *Attorney, Agent, or Firm* — Barnes & Thornburg LLP

(57) ABSTRACT

A method and apparatus for controlling an inverter includes operating the inverter in a one of a normal run mode or a pulse mode depending on one or more criteria. When operating in the pulse mode, the inverter generates a sinusoidal output pulse waveform including a plurality of pulses having a determined pulse width. The pulse width is less than a half-wave period of a full-cycle sinusoidal waveform and may be determined as function of, for example, the output power of the inverter, a grid voltage, and/or other criteria.

20 Claims, 13 Drawing Sheets

(56) References Cited

U.S. PATENT DOCUMENTS

| | | |
|---|---|---|
| 5,148,043 A | 9/1992 | Hirata et al. |
| 5,160,851 A | 11/1992 | McAndrews |
| 5,191,519 A | 3/1993 | Kawakami |
| 5,309,073 A | 5/1994 | Kaneko et al. |
| 5,343,380 A | 8/1994 | Champlin |
| 5,473,528 A | 12/1995 | Hirata |
| 5,668,464 A | 9/1997 | Krein |
| 5,684,385 A | 11/1997 | Guyonneau et al. |
| 5,721,481 A | 2/1998 | Narita et al. |
| 5,745,356 A | 4/1998 | Tassitino |
| 5,796,182 A | 8/1998 | Martin |
| 5,801,519 A | 9/1998 | Midya et al. |
| 5,886,890 A | 3/1999 | Ishida et al. |
| 5,929,537 A | 7/1999 | Glennon |
| 5,978,236 A | 11/1999 | Faberman et al. |
| 5,982,645 A | 11/1999 | Levran et al. |
| 6,046,402 A | 4/2000 | More |
| 6,154,379 A | 11/2000 | Okita |
| 6,157,168 A | 12/2000 | Malik |
| 6,180,868 B1 | 1/2001 | Yoshino et al. |
| 6,201,180 B1 | 3/2001 | Meyer et al. |
| 6,201,319 B1 | 3/2001 | Simonelli et al. |
| 6,225,708 B1 | 5/2001 | Furukawa |
| 6,268,559 B1 | 7/2001 | Yamawaki |
| 6,285,572 B1 | 9/2001 | Onizuka et al. |
| 6,291,764 B1 | 9/2001 | Ishida et al. |
| 6,311,279 B1 | 10/2001 | Nguyen |
| 6,356,471 B1 | 3/2002 | Fang |
| 6,369,461 B1 | 4/2002 | Jungreis et al. |
| 6,381,157 B2 | 4/2002 | Jensen |
| 6,445,089 B1 | 9/2002 | Okui |
| 6,462,507 B2 | 10/2002 | Fisher |
| 6,489,755 B1 | 12/2002 | Boudreaux et al. |
| 6,563,234 B2 | 5/2003 | Hasegawa et al. |
| 6,605,881 B2 | 8/2003 | Takehara et al. |
| 6,614,132 B2 | 9/2003 | Hockney et al. |
| 6,624,533 B1 | 9/2003 | Swanson |
| 6,657,321 B2 | 12/2003 | Sinha |
| 6,700,802 B2 | 3/2004 | Ulinski et al. |
| 6,727,602 B2 | 4/2004 | Olson |
| 6,750,391 B2 | 6/2004 | Bower et al. |
| 6,765,315 B2 | 7/2004 | Hammerstrom |
| 6,770,984 B2 | 8/2004 | Pai |
| 6,795,322 B2 | 9/2004 | Aihara et al. |
| 6,838,611 B2 | 1/2005 | Kondo et al. |
| 6,847,196 B2 | 1/2005 | Garabandic |
| 6,881,509 B2 | 4/2005 | Jungreis |
| 6,882,063 B2 | 4/2005 | Droppo et al. |
| 6,950,323 B2 | 9/2005 | Achleitner |
| 7,031,176 B2 | 4/2006 | Kotsopoulos et al. |
| 7,072,195 B2 | 7/2006 | Xu |
| 7,091,707 B2 | 8/2006 | Cutler |
| 7,193,872 B2 | 3/2007 | Siri |
| 7,233,130 B1 | 6/2007 | Kay |
| 7,289,341 B2 | 10/2007 | Hesterman |
| 7,319,313 B2 | 1/2008 | Dickerson et al. |
| 7,324,361 B2 | 1/2008 | Siri |
| 7,339,287 B2 | 3/2008 | Jepsen et al. |
| 7,365,998 B2 | 4/2008 | Kumar |
| 7,405,494 B2 | 7/2008 | Tassitino, Jr. et al. |
| 7,420,354 B2 | 9/2008 | Cutler |
| 7,432,691 B2 | 10/2008 | Cutler |
| 7,463,500 B2 | 12/2008 | West |
| 7,502,697 B2 | 3/2009 | Holmquist et al. |
| 7,521,914 B2 | 4/2009 | Dickerson et al. |
| 7,531,993 B2 | 5/2009 | Udrea et al. |
| 7,551,460 B2 | 6/2009 | Lalithambika et al. |
| 7,577,005 B2 | 8/2009 | Angerer et al. |
| 7,592,789 B2 | 9/2009 | Jain |
| 7,609,040 B1 | 10/2009 | Jain |
| 7,626,834 B2 | 12/2009 | Chisenga et al. |
| 7,638,899 B2 | 12/2009 | Tracy et al. |
| 7,646,116 B2 | 1/2010 | Batarseh et al. |
| 7,660,139 B2 | 2/2010 | Garabandic |
| 7,667,610 B2 | 2/2010 | Thompson |
| 7,710,752 B2 | 5/2010 | West |
| 7,733,679 B2 | 6/2010 | Luger et al. |
| 7,768,155 B2 | 8/2010 | Fornage |
| 7,777,587 B2 | 8/2010 | Stevenson et al. |
| 7,796,412 B2 | 9/2010 | Fornage |
| RE41,965 E | 11/2010 | West |
| 7,839,022 B2 | 11/2010 | Wolfs |
| 7,855,906 B2 | 12/2010 | Klodowski et al. |
| RE42,039 E | 1/2011 | West et al. |
| 7,884,500 B2 | 2/2011 | Kernahan |
| 7,899,632 B2 | 3/2011 | Fornage et al. |
| 7,916,505 B2 | 3/2011 | Fornage |
| 8,279,642 B2 * | 10/2012 | Chapman et al. ............... 363/39 |
| 8,284,574 B2 * | 10/2012 | Chapman et al. ............... 363/41 |
| 2001/0043050 A1 | 11/2001 | Fisher |
| 2002/0017822 A1 | 2/2002 | Umemura et al. |
| 2002/0196026 A1 | 12/2002 | Kimura et al. |
| 2005/0213272 A1 | 9/2005 | Kobayashi |
| 2006/0067137 A1 | 3/2006 | Udrea |
| 2006/0083039 A1 | 4/2006 | Oliveira |
| 2007/0040539 A1 | 2/2007 | Cutler |
| 2007/0040540 A1 | 2/2007 | Cutler |
| 2007/0133241 A1 | 6/2007 | Mumtaz et al. |
| 2007/0221267 A1 | 9/2007 | Fornage |
| 2008/0055952 A1 | 3/2008 | Chisenga et al. |
| 2008/0078436 A1 | 4/2008 | Nachamkin et al. |
| 2008/0106921 A1 | 5/2008 | Dickerson et al. |
| 2008/0183338 A1 | 7/2008 | Kimball et al. |
| 2008/0203397 A1 | 8/2008 | Amaratunga et al. |
| 2008/0266922 A1 | 10/2008 | Mumtaz et al. |
| 2008/0272279 A1 | 11/2008 | Thompson |
| 2008/0283118 A1 | 11/2008 | Rotzoll et al. |
| 2008/0285317 A1 | 11/2008 | Rotzoll |
| 2008/0304296 A1 | 12/2008 | NadimpalliRaju et al. |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0079383 A1 | 3/2009 | Fornage et al. |
| 2009/0080226 A1 | 3/2009 | Fornage |
| 2009/0084426 A1 | 4/2009 | Fornage et al. |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242272 A1 | 10/2009 | Little et al. |
| 2009/0243587 A1 | 10/2009 | Fornage |
| 2009/0244929 A1 | 10/2009 | Fornage |
| 2009/0244939 A1 | 10/2009 | Fornage |
| 2009/0244947 A1 | 10/2009 | Fornage |
| 2009/0296348 A1 | 12/2009 | Russell et al. |
| 2010/0085035 A1 | 4/2010 | Fornage |
| 2010/0088052 A1 | 4/2010 | Yin et al. |
| 2010/0091532 A1 | 4/2010 | Fornage |
| 2010/0106438 A1 | 4/2010 | Fornage |
| 2010/0139945 A1 | 6/2010 | Dargatz |
| 2010/0175338 A1 | 7/2010 | Garcia Cors |
| 2010/0176771 A1 | 7/2010 | Fieldhouse et al. |
| 2010/0181830 A1 | 7/2010 | Fornage et al. |
| 2010/0195357 A1 | 8/2010 | Fornage et al. |
| 2010/0214808 A1 | 8/2010 | Rodriguez |
| 2010/0222933 A1 | 9/2010 | Smith et al. |
| 2010/0236612 A1 | 9/2010 | Khajehoddin et al. |
| 2010/0263704 A1 | 10/2010 | Fornage et al. |
| 2010/0283325 A1 | 11/2010 | Marcianesi et al. |
| 2010/0309695 A1 | 12/2010 | Fornage |
| 2011/0012429 A1 | 1/2011 | Fornage |

(56) References Cited

U.S. PATENT DOCUMENTS

| | | | |
|---|---|---|---|
| 2011/0019444 A1 | 1/2011 | Dargatz et al. | |
| 2011/0026281 A1 | 2/2011 | Chapman et al. | |
| 2011/0026282 A1 | 2/2011 | Chapman et al. | |
| 2011/0043160 A1 | 2/2011 | Serban | |
| 2011/0049990 A1 | 3/2011 | Amaratunga et al. | |
| 2011/0051820 A1 | 3/2011 | Fornage | |
| 2011/0130889 A1 | 6/2011 | Khajehoddin et al. | |
| 2013/0027982 A1* | 1/2013 | Chapman et al. | 363/17 |
| 2013/0094268 A1* | 4/2013 | Chapman et al. | 363/132 |

FOREIGN PATENT DOCUMENTS

| | | |
|---|---|---|
| CA | 2693737 A1 | 8/2010 |
| DE | 20012131 U1 | 3/2001 |
| EP | 1794799 A1 | 6/2007 |
| EP | 1803161 A1 | 7/2007 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | 2004008619 A2 | 1/2004 |
| WO | 2004100348 A1 | 11/2004 |
| WO | 2004100348 A8 | 12/2005 |
| WO | 2006048688 A1 | 5/2006 |
| WO | 2007080429 A2 | 7/2007 |
| WO | 2009081205 A2 | 7/2009 |
| WO | 2009081205 A3 | 10/2009 |
| WO | 2009134756 A1 | 11/2009 |

OTHER PUBLICATIONS

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power Inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995-Dec. 25, 1996," NREL/SR-520-23432, UC Category 1280, 1997, 31 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

Sen et al., "A New DC-TO-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l Conf. Power Electronics, vol. 1, pp. 559-564, 1996.

Takahashi et al., "Electrolytic Capacitor-Less PWM Inverter," in Proceedings of the IPEC '90, Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A 1φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.

Wu, et al., "A 1φ 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected Inverters for Photovoltaic Modules," IEEE Trans on Power Electronics, vol. 41, No. 5, pp. 1292-1306, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the Photoenergytm Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum

(56) References Cited

OTHER PUBLICATIONS

DC Link Capacitance," The 27th Annual Conference of the IEEE Industrial Electronics Society, vol. 3, pp. 1994-1999, 2001.
Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.
Kutkut, "PV Energy Conversion and System Integration," Florida Energy Systems Consortium, 2009, 24 pages.
Kwon et al., "High-efficiency Module-integrated Photovoltaic Power Conditioning System," IET Power Electronics, doi: 10.1049/iet-pel.2008.0023, 2008.
Lohner et al., "A New Panel-integratable Inverter Concept for Grid-Connected Photovoltaic Systems," IEEE ISIE '96, vol. 2, pp. 827-831, 1996.
Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.
Martins et al., "Interconnection of a Photovoltaic Panels Array to a Single-Phase Utility Line From a Static Conversion System," Proc. IEEE Power Electronics Specialists Conf., pp. 1207-1211, 2000.
Martins et al., "Usage of the Solar Energy from the Photovoltaic Panels for the Generation of Electrical Energy," The 21st International Telecommunication Energy Conference, 6 pages, 1999.
Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.
Meinhardt et al., "Miniaturised 'low profile' Module Integrated Converter for Photovoltaic Applications with Integrated Magnetic Components," IEEE APEC '99, vol. 1, pp. 305-311, 1999.
Meza et al., "Boost-Buck Inverter Variable Structure Control for Grid-Connected Photovoltaic Systems," IEEE International Symposium on Circuits and Systems, vol. 2, pp. 1318-1321, 2005.
Midya et al., "Dual Switched Mode Power Converter," 15th Annual Conference of IEEE Industrial Electronics Society, vol. 1, pp. 155-158, Mar. 1989.
Midya et al., "Sensorless Current Mode Control—An Observer-Based Technique for DC-DC Converters," IEEE Transactions on Power Electronics, vol. 16, No. 4, pp. 522-526, Jul. 2001.
Ando et al., "Development of Single Phase UPS Having AC Chopper and Active Filter Ability," IEEE International Conference on Industrial Technology, 10.1109/ICIT.2006.372445, pp. 1498-1503, 2006.
Biel et al., "Sliding-Mode Control Design of a Boost-Buck Switching Converter for AC Signal Generation," vol. 51, issue 8, pp. 1539-1551, 2004.
Biel et al., "Sliding-Mode Control of a Single-Phase AC/DC/AC Converter," Proceedings of the 40th IEEE Conference on Decision and Control, vol. 1., pp. 903-907, Dec. 2001.
Bose et al., "Electrolytic Capacitor Elimination in Power Electronic System by High Frequency Filter," Conference Record of the 1991 IEEE Industry Applications Society Annual Meeting, vol. 1, pp. 869-878, 1991.
Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.
Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.
Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.
Brekken, "Utility-Connected Power Converter for Maximizing Power Transfer From a Photovoltaic Source," Thesis Submitted to the Faculty of the Graduate School of the University of Minnesota, Jun. 2002, 56 pages.
Bush, "UK Solar Firm Discloses Novel Inverter Topology," ElectronicsWeekly.com. Apr. 2011, last accessed Aug. 30, 2011 at http://www.electronicsweekly.com/Articles/2011/O4/26/50953/UK-solar-firm-discloses-novel-inverter-topology.htm.

Chang et al., "The Impact of Switching Strategies on Power Quality for Integral Cycle Controllers," IEEE Transactions on Power Delivery, vol. 18, No. 3, pp. 1073-1078, Jul. 2003.
Chisenga, "Development of a Low Power Photovoltaic Inverter for Connection to the Utility Grid," PhD Thesis, Fitzwilliam College, Cambridge, 173 pages, 2007.
Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.
Edelmoser, "Improved Solar Inverter With Wide Input Voltage Range," IEEE 10th Mediterranean Conference, MEleCon 2000, vol. 2, pp. 810-813, 2000.
Enphase Energy, "Application Note: Multi-Tenant Design Guidelines," rev. 1, 5 pages, 2008.
Enphase Energy, "Enphase Field Wiring Diagram—M190 & M210 Microinverters—240v, Single Phase," Drawing No. 144-00001, rev. 6, 1 page, 2009.
Enphase Energy, "Enphase Micro-Inverter Technical Data," Doc. No. 142-00004, rev. 2, 2 pages, 2008.
Esram et al., "Comparison of Photovoltaic Array Maximum Power Point Tracking Techniques," IEEE Transactions on Energy Conversion, vol. 22, No. 2, pp. 439-449, Jun. 2007.
Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.
Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.
Hung et al., "Analysis and Implementation of a Delay-compensated Deadbeat Current Controller for Solar Inverters," IEEE Proceedings—Circuits, Devices and Systems, pp. 279-286, 2001.
Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.
Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.
Jeong et al., "An Improved Method for Anti-Islanding by Reactive Power Control," pp. 965-970, 2005.
Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.
Jung et al., "High-frequency DC Link Inverter For Grid-Connected Photovoltaic System," Conference Record of the Twenty-Ninth IEEE Photovoltaic Specialists Conference, pp. 1410-1413, 2002.
Kern, "SunSine300: Manufacture of an AC Photovoltaic Module, Final Report, Phases I & II, Jul. 25, 1995-Jun. 30, 1998," NREL/SR-520-26085, 1999, 32 pages.
Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.
Khajehoddin et al., "A Novel Topology and Control Strategy for Maximum Power Point Trackers and Multi-string Grid-connected PV Inverters," Applied Power Electronics Conference, APECO8, pp. 173-178, 2008.
Khajehoddin et al., "A Robust Power Decoupler and Maximum Power Point Tracker Topology for a Grid-Connected Photovoltaic System," IEEE Power Electronics Specialists Conference, PESCO8, pp. 66-69, 2008.
Kim et al., "New Control Scheme for AC-DC-AC Converter Without DC Link Electrolytic Capacitor," 24th Annual IEEE Power Electronics Specialists Conference, PESC '93 Record., pp. 300-306, 1993.
Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.
Kern, "Inverter Technology for the Solar Industry," Siemens Energy & Automation, 2009, 20 pages.
Curran, "Grid-Connected Solar Microinverter Reference Design," Microchip Technology Incorporated, 2010, 31 pages.

\* cited by examiner

METHOD AND APPARATUS FOR CONTROLLING AN INVERTER USING PULSE MODE CONTROL

CROSS-REFERENCE TO RELATED U.S. PATENT APPLICATION

This present application is a continuation application of U.S. application Ser. No. 13/324,023, now U.S. Pat. No. 8,284,574, entitled "Method and Apparatus for Controlling an Inverter Using Pulse Mode Control" by Patrick Chapman et al, which was filed on Dec. 13, 2011, and which claims priority under 35 U.S.C. §119(e) to U.S. Provisional Patent Application Ser. No. 61/548,018, entitled "METHOD AND APPARATUS FOR CONTROLLING AN INVERTER USING PULSE MODE CONTROL" by Patrick Chapman et al., which was filed on Oct. 17, 2011, the entirety of which is hereby incorporated by reference.

TECHNICAL FIELD

The present disclosure relates, generally, to power converters for converting direct current (DC) power to alternating current (AC) power and, more particularly, to methods, apparatuses, and devices for controlling and shaping the output power of such power converters.

BACKGROUND

Power inverters convert a DC power to an AC power. Some power inverters are configured to convert the DC power to an AC power suitable for supplying energy to an AC grid and, in some cases, an AC load coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency.

The amount of power that can be delivered by certain alternative energy sources, such as photovoltaic cells ("PV cells" or "solar cells"), may vary in magnitude over time due to temporal variations in operating conditions. For example, the output of a typical PV cell will vary as a function of variations in sunlight intensity, angle of incidence of sunlight, ambient temperature and other factors. Additionally, photovoltaic cells have a single operating point at which the values of the current and voltage of the cell result in a maximum power output. This "maximum power point" ("MPP") is a function of environmental variables, including light intensity and temperature. Inverters for photovoltaic systems typically comprise some form of maximum power point tracking ("MPPT") as a means of finding and tracking the maximum power point ("MPP") and adjusting the inverter to exploit the full power capacity of the cell at the MPP.

An important parameter used to measure the performance of alternative energy source inverters is the efficiency of the inverter. Efficiency is typically defined as the ratio of output power from the inverter to input power to the inverter. Although at first glance, improvement of efficiency appears to be a straightforward, improving or otherwise controlling the efficiency of alternative energy source inverters can be complicated. Such complications occur because the efficiency of the inverter may vary with the output power from the inverter (e.g., the efficiency may decrease as the output power decreases). Additionally, some energy efficiency measurement protocols weight the efficiencies of inverters measurements based on the percentage of the rated power. For example, some measurement protocols apply a significant weight to the efficiency of the inverter at light loads, which as discussed above may be at the inverter's lower efficiency end. Alternatively, other energy efficiency measurement protocols utilize a "flat" weighting curve. However, even under such alternative measurement protocols, many inverters naturally exhibit a lower efficiency at lower output power levels.

To improve performance under such efficiency measurement protocols, some inverters implement a "burst mode" technique in which the output of the inverter is turned on for short durations to periodically generate one or more full sinewave output cycles. For example, as shown in FIG. 13, such "burst mode" inverters may skip one or more output cycles such that a full sinewave output cycle is generated only every other cycle. However, the "burst mode" technique may be restricted to use only at very light loads due to regulatory requirements, can cause significant harmonic distortion, including subharmonics, in the inverter output, and may be difficult to implement in an array of individual inverters and/or alongside a standard run mode of the inverter.

SUMMARY

According to one aspect, a method for controlling an inverter may include determining an output frequency of the inverter and determining a pulse width value for an output waveform of the inverter. The pulse width value may be less than a half-wave period of a full-cycle sinusoidal waveform at the output frequency. The method may also include generating a sinusoidal output pulse waveform comprising a plurality of pulses having a pulse width equal to the pulse width value.

In some embodiments, the method may include sensing a grid frequency of a power grid to which the inverter is connected and setting the output frequency substantially equal to the grid frequency. Additionally, in some embodiments, the method may include determining an output power of the inverter and determining a pulse width value for the output waveform as a function of the output power. For example, determining the pulse width value for the output waveform may include determining a pulse width value of the output waveform that is directly proportional to the output power. Additionally or alternatively, determining a pulse width value may include accessing a data table in memory that correlates output power to pulse width values.

The method may also include adjusting the pulse width value in response to a change in the output power of the inverter. For example, adjusting the pulse width value may include decreasing the pulse width value in response to a decrease in the output power of the inverter. The method may also include determining the pulse width value as a function of a grid voltage of a power grid and/or determining the pulse width value according to a predetermined equation.

In some embodiments, generating the sinusoidal output pulse may include turning on an output converter of the inverter for a duration equal to the pulse width value. In such embodiments, turning on the output converter may include generating switching signals to the output converter only for a duration equal to the pulse width value. Additionally, in some embodiments, the sinusoidal output pulse may be embodied as a sinusoidal output current pulse waveform.

The method may also include determining a voltage of a direct current (DC) bus of the inverter and determining an amplitude of the sinusoidal output pulse as a function of the voltage of the DC bus to maintain the DC bus at a reference voltage level. Additionally or alternatively, the method may include determining a phase of a grid waveform of a power grid and generating a sinusoidal output pulse that is in phase with the grid waveform. In such embodiments, generating the sinusoidal output pulse may include generating a positive sinusoidal output pulse in phase with a positive half-cycle of the grid waveform and generating a negative sinusoidal output pulse in phase with a negative half-cycle of the grid waveform. The method may further include comparing an output power of the inverter to a reference output power level and operating the inverter in a normal run mode to generate a full-cycle sinusoidal output waveform in response to the power output of the inverter exceeding the reference output power level.

According to another aspect, an inverter for converting direct current (DC) power to an alternating current (AC) power includes an output converter to generate an output waveform at an output frequency in response to a plurality of switching signals and an output converter controller coupled to the output converter. The output converter controller is configured to determine a pulse width value for the output waveform of the inverter, the pulse width value being less than a half-wave period of the output frequency and generate the plurality of switching signals to cause the output converter to generate a sinusoidal output pulse having a pulse width equal to the pulse width value.

In some embodiments, to determine the pulse width value may include to determine an output power of the inverter and to determine the pulse width value for the output waveform as a function of the output power. Additionally, in some embodiments, the inverter may further include a memory device having stored therein a data table that correlates output power to pulse width values. In such embodiments, to determine the pulse width value may include to access the data table to retrieve the pulse width value from the data table as a function of the output power.

Additionally, in some embodiments, the output converter controller may be further configured to adjust the pulse width value in response to a change in the output power of the inverter. In such embodiments, to generate the plurality of switching signals may include to generate the plurality of switching signals for a duration equal to the pulse width value. Additionally, in some embodiments, the inverter may further include a DC bus electrically connected to the output converter. In such embodiments, the output converter controller may be further configured to determine an amplitude of the sinusoidal output pulse as a function of a voltage of the DC bus to maintain the DC bus at a reference voltage level.

According to a further aspect, an apparatus may include solar panel and an inverter coupled to the solar cell panel. The solar panel may be includes a plurality of solar cells configured to generate a direct current (DC) power output in response to receiving an amount of sunlight. The inverter may be configured to convert the DC power output to an AC power output. The inverter may include a converter circuit to generate an output waveform at an output frequency and a converter control circuit to control the operation of the converter circuit. The converter control circuit may be configured to determine an output power of the inverter, operate the inverter in a normal run mode to cause the converter circuit to generate a full-cycle sinusoidal output waveform at the output frequency in response to the output power being equal to or greater than a reference output power threshold, and operate the converter circuit in a pulse mode to cause the converter circuit to generate a sinusoidal pulse output waveform having a pulse width less than a half-wave period of the full-cycle sinusoidal output waveform in response to the output power being less than the reference threshold.

In some embodiments, to operate the converter circuit in the pulse mode may include to determine a pulse width value as a function of the output power and to cause the converter circuit to generate a sinusoidal pulse output waveform having a pulse width equal to the pulse width value. Additionally, in some embodiments, to operate the converter circuit in the pulse mode may include to adjust the pulse width value in response to a change in the output power.

Additionally, in some embodiments, the inverter may further include a DC bus electrically connected to the converter circuit. In such embodiments, the converter control circuit may be further configured to determine an amplitude of the sinusoidal output pulse as a function of a voltage of the DC bus to maintain the DC bus at a reference voltage level. Additionally, in some embodiments, to operate the converter circuit in the pulse mode may include to determine a phase of a grid waveform of a power grid and to cause the converter circuit to generate a sinusoidal pulse output waveform in phase with the grid waveform.

DETAILED DESCRIPTION

Figure 1:
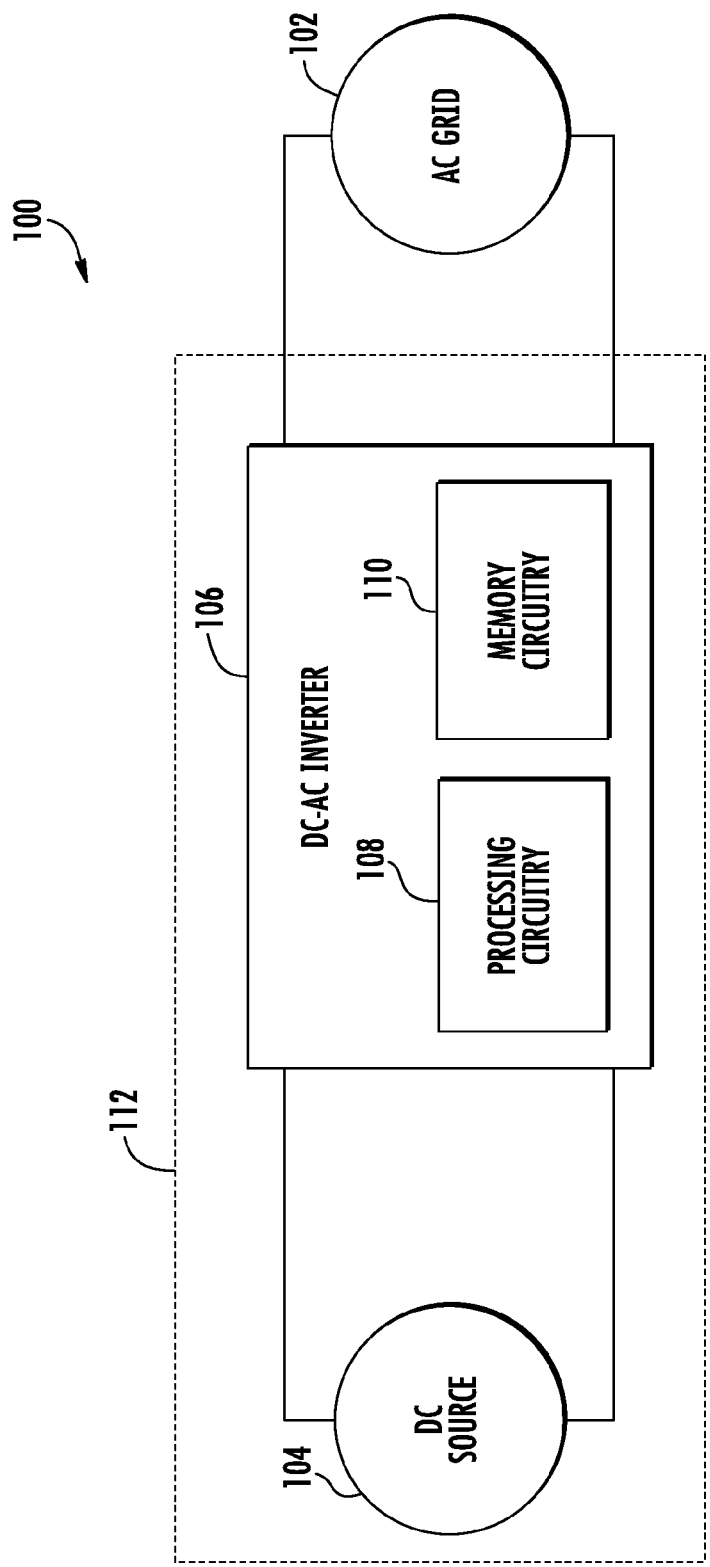
FIG. 1 is a simplified block diagram of one embodiment a system for converting DC power to AC power.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring to FIG. 1, a system 100 for supplying alternating current (hereinafter "AC") power to an AC grid 102 at a grid frequency includes a direct current (hereinafter "DC") source 104 and a DC-AC inverter 106. The DC source 104 may be embodied as any type of DC source configured to generate or produce a DC power, which is supplied to the inverter 106. For example, the DC source 104 may be embodied as a renewable energy source such as a photovoltaic solar cell or array, a fuel cell, a wind turbine configured to generate a DC power (e.g., via a rectifying circuit), a water turbine configured to generate a DC power, or other renewable energy source configured to generate a DC power.

The inverter 106 is electrically connected to the DC source 104 and configured to convert a DC waveform generated by the DC source 104 to an output waveform suitable for delivery to the AC grid 102 and, in some embodiments, loads coupled to the AC grid 102. The AC grid may be embodied as, for example, a utility power grid that supplies utility AC power to residential and commercial users. Such utility power grids may be characterized as having an essentially sinusoidal bipolar voltage at a fixed grid frequency (e.g., f=ω/2π=50 Hz or 60 Hz).

The inverter 106 includes a plurality of circuits to facilitate the conversion of the DC power to the AC power as discussed in more detail below. In some embodiments, the inverter 106 may include one or more processing circuits 108 and one or more memory circuits 110. The processing circuit 108 may be embodied as or otherwise include one or more processors, an application specific integrated circuit (ASIC), field programmable gate array (FPGA), microcontrollers, digital signal processors, logic devices, and/or other processing circuit/device and associated circuitry configured to perform one or more of the functions described herein. The memory circuits 110 may be embodied as read-only memory devices and/or random access memory devices. For example, the memory circuit 110 may be embodied as or otherwise include dynamic random access memory devices (DRAM), synchronous dynamic random access memory devices (SDRAM), double-data rate dynamic random access memory devices (DDR SDRAM), and/or other volatile or non-volatile memory devices. The memory circuits 110 may have stored therein a plurality of instructions for execution by the processing circuits 108 to control particular functions of the inverter as discussed in more detail below.

Figure 2:
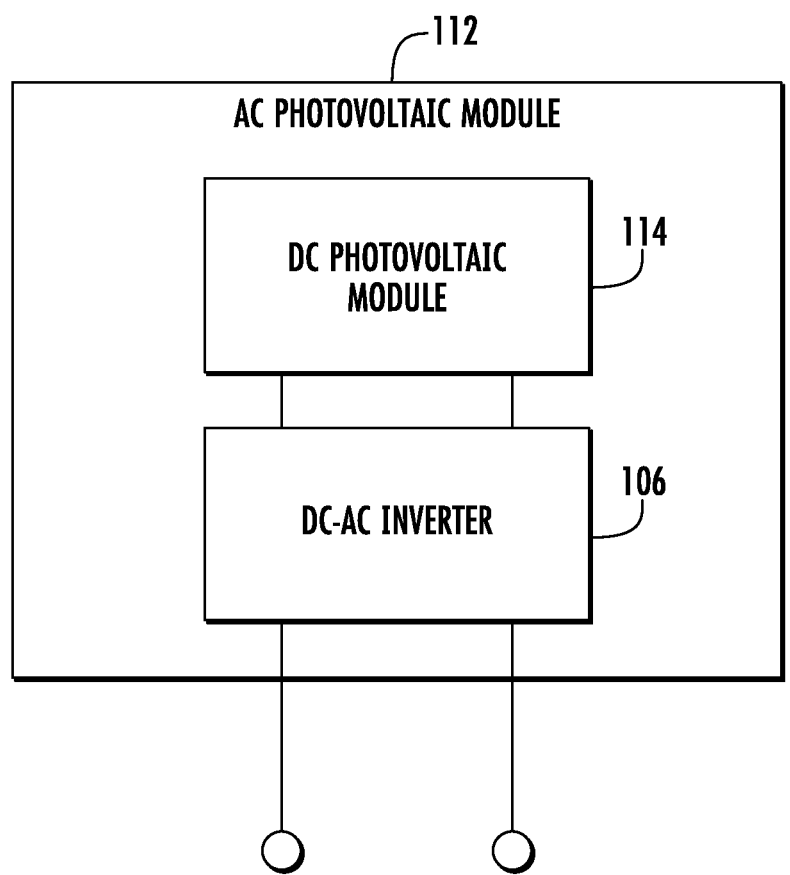
FIG. 2 is a simplified block diagram one embodiment of an AC photovoltaic module of the system of FIG. 1.

As discussed above, in some embodiments, the DC source 104 may be embodied as one or more photovoltaic cells. In such embodiments, the DC source 104 and the inverter 106 may be associated with each other to embody an AC photovoltaic module (ACPV) 112 as illustrated in FIG. 2. The ACPV 112 includes a DC photovoltaic module (DCPV) 114, which operates as the DC source 104, electrically coupled to the inverter 106. The DCPV 114 includes one or more photovoltaic cells and is configured to deliver a DC waveform to the inverter 106 in response to receiving an amount of sunlight. The DC power delivered by the ACPV 112 is a function of environmental variables, such as, e.g., sunlight intensity, sunlight angle of incidence and temperature. In some embodiments, the inverter 106 is positioned in a housing of the ACPV 112. Alternatively, the inverter 106 may include its own housing secured to the housing of the ACPV 112. Additionally, in some embodiments, the inverter 106 is separate from the housing, but located near the DCPV 114. As discussed above, the inverter 106 is configured to convert the DC power received from the DCPV 114 to an AC power suitable for delivery to the AC grid 102 at the grid frequency. It should be appreciated that multiple ACPVs 112 may be used to form a solar panel array with each ACPV 112 having a dedicated inverter 106.

Figure 3:
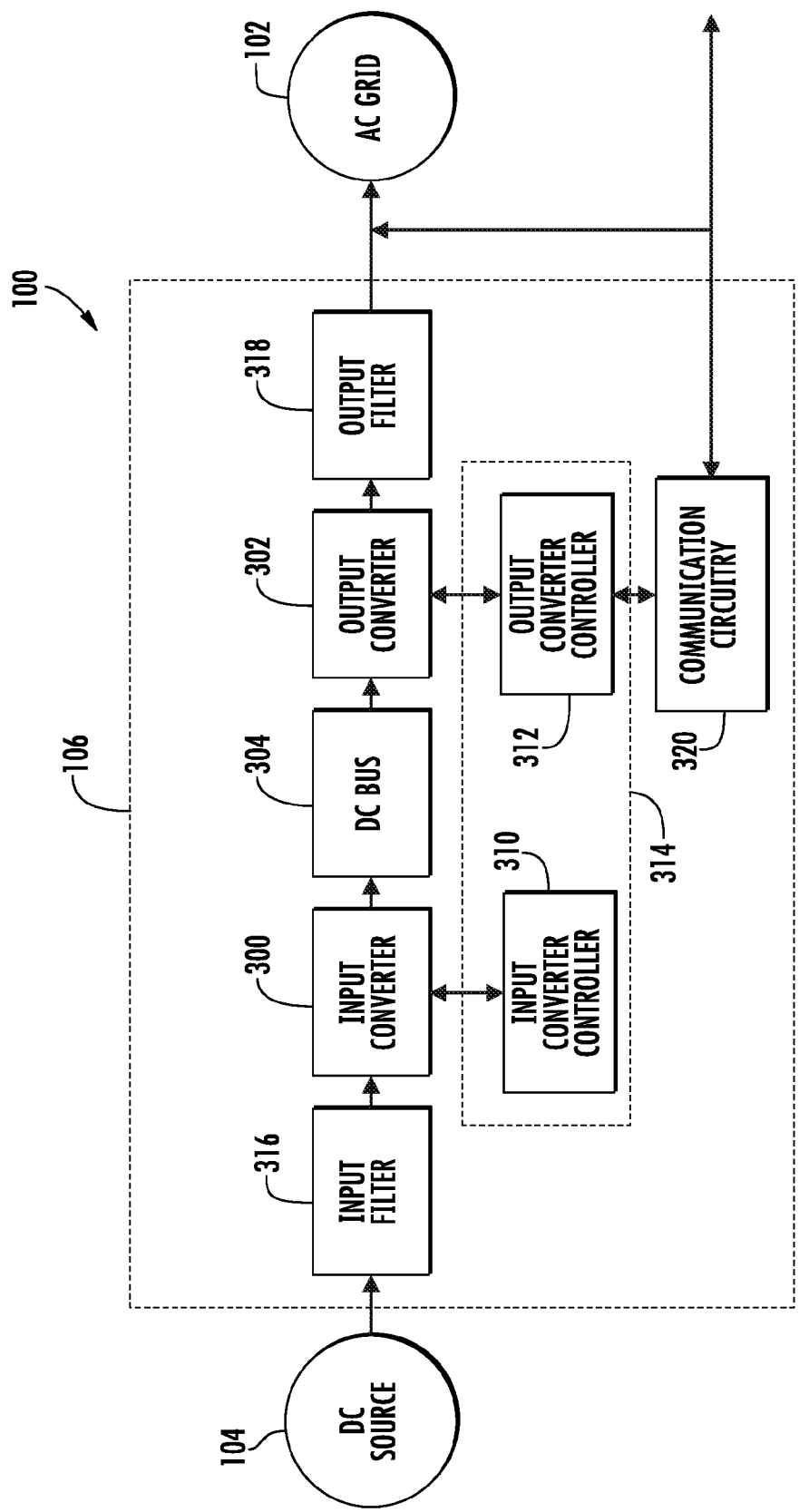
FIG. 3 is a simplified block diagram of one embodiment of an inverter of the system of FIG. 1.

Referring now to FIG. 3, in one illustrative embodiment, the inverter 106 includes an input converter 300 electrically coupled to a DC bus 304, an output converter 302 electrically coupled to the DC bus 304, an input converter controller 310 electrically coupled to the input converter 300, and an output converter controller 312 electrically coupled to the output converter 302. Although shown in FIG. 3 as separated controllers, the input converter controller 310 and the output converter controller 312 may be embodied as or otherwise included in a single converter controller 314 electrically coupled to each of the input converter 300 and the output converter 302.

In the illustrative embodiment, the input converter 300 is embodied as a DC-to-DC converter configured to convert low voltage DC power to high voltage DC power. That is, the input converter 300 converts the DC power received from the DC source 104 to a high level DC voltage power, which is supplied to the DC bus 304. The input converter controller 310 controls the operation of the input converter 300 to convert the low voltage DC power received from the DC source 104 to the high voltage DC power supplied to the DC bus 304. Additionally, as discussed in more detail below, the input converter controller 310 may be configured to control the operation of the input converter 300 based on a maximum power point tracking ("MPPT") algorithm or methodology. To do so, the input converter controller may generate and provide a plurality of switching signals to various circuits of the input converter 300 as discussed in more detail below.

The output converter 302 is embodied as a DC-to-AC converter configured to convert the high voltage DC power from the DC bus 304 to AC power, which is supplied to the AC grid 102 at the grid frequency in some embodiments. The output converter controller 312 controls the operation of the output converter to the DC power of the DC bus 304 to AC power. As discussed in more detail below, the output converter controller 312 is configured to operate the output converter in one of a plurality of operation modes. For example, in one particular embodiment, the output converter controller 312 is configured to operate the output converter 302 in a normal run mode to cause the output converter 302 to generate a full-cycle sinusoidal output waveform or a pulse mode to cause the cause the output converter 302 to generate a sinusoidal pulse output having a determined pulse width.

In some embodiments, the inverter 106 may also include an input filter 316 electrically coupled to the input converter 300 and the DC source 104 and an output filter 318 electrically coupled to the output converter 302 and the AC grid 102. It should be appreciated that the single-phase power output of the inverter 106 includes an average component and a time-varying component due to variations in the DC source 104 and/or demands of the AC grid 102. The time-varying component has a frequency substantially equal to twice the output AC waveform (i.e., the grid frequency). Without filtering, such double-frequency power ripple must be supplied by the DC source 104 (i.e., the double frequency ripple power propagates back and forth between the AC grid 102 and the DC source 104). Such demands on the DC source 104 can result in failure or lower performance of the DC source 104 and inverter 106. As such, the input filter 316 is configured to filter the double-frequency power ripple on the low voltage bus from the DC source 104. Similarly, the output filter 318 is configured to filter the AC power supplied by the output converter 302 prior to being received by the AC grid 102.

Additionally, in some embodiments, the inverter 206 may include communication circuitry 320. The communication circuitry 320 may be communicatively coupled to the output converter controller 312 (or the converter controller 314 in embodiments in which the input converter controller 310 and the output converter controller 312 are combined into a single controller) or may be incorporated therein in some embodiments. The output converter controller 312 may utilize the communication circuitry 320 to communicate with remote devices, such as remote controllers or servers. In one particular embodiment, the communication circuitry 320 is embodied as a power line communication circuit configured to communicate with remote devices over an AC power line, such as the AC power line interconnects coupled to the output of the output converter 302. However, in other embodiments, other communication technologies and/or protocols may be used. For example, in some embodiments, the communication circuitry 320 may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol.

Figure 4:
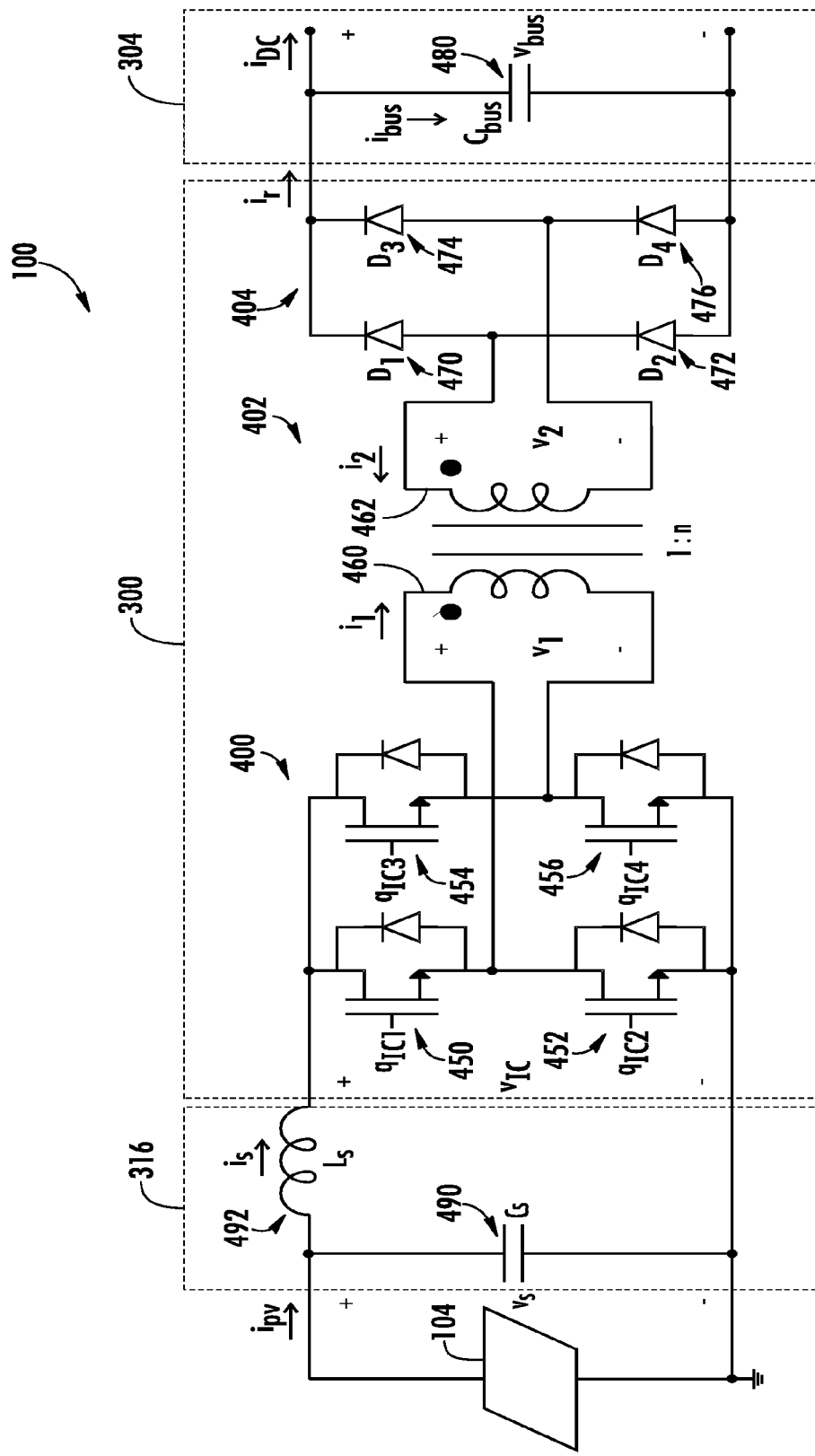
FIGS. 4 and 5 are simplified schematic diagrams of the inverter of FIG. 3.
Figure 5:
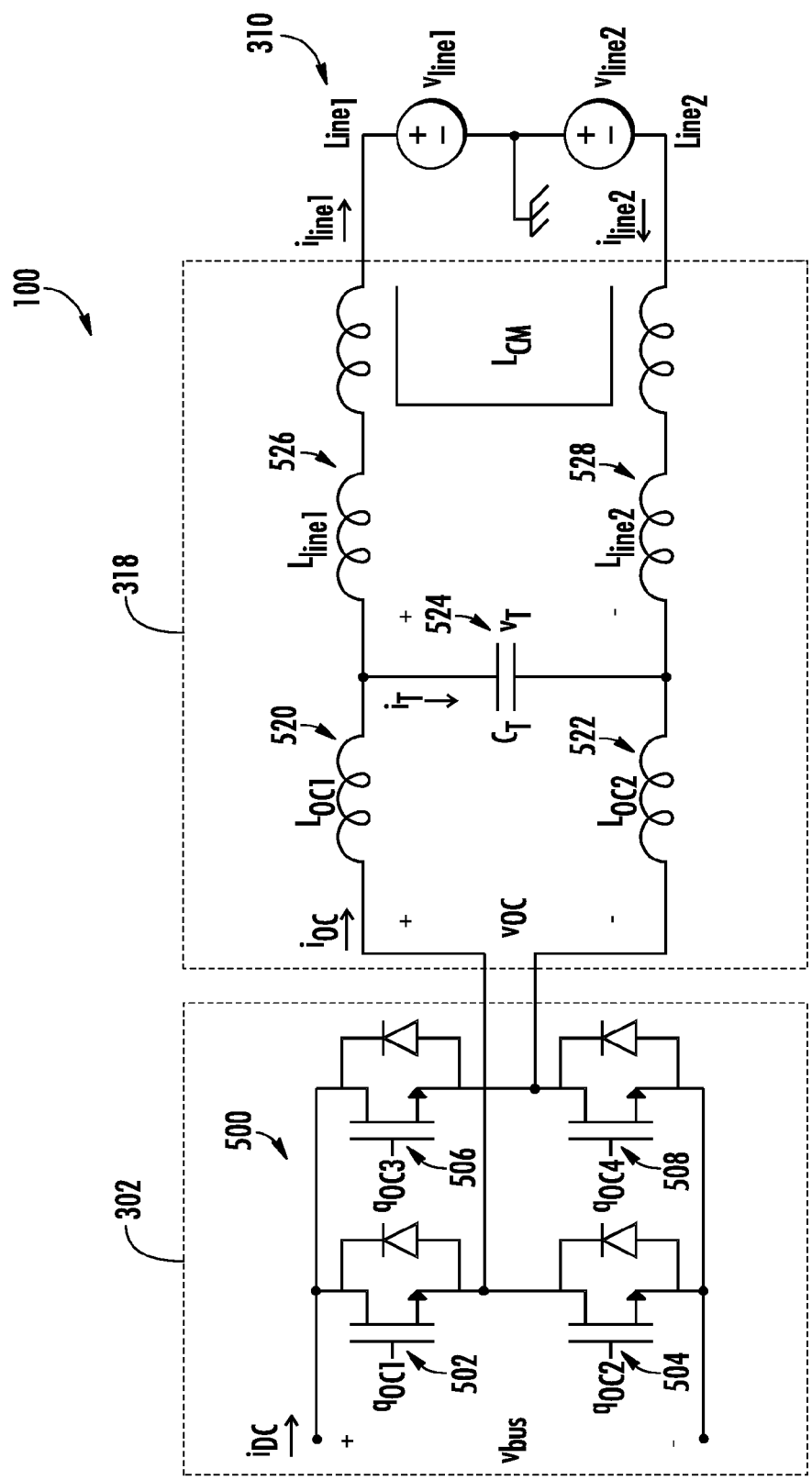

Referring now to FIGS. 4 and 5, in one particular embodiment, the input converter 300 includes an inverter circuit 400, a transformer 402, and a rectifier 404. The inverter circuit 400 is embodied as a DC-to-AC inverter circuit configured to convert the DC waveform supplied by the DC source 104 to an AC waveform delivered to a primary of the transformer 402. For example, the inverter circuit 400 is illustrative embodied as a bridge circuit formed by a plurality of switches 450, 452, 454, 456. Each of the switches 450, 452, 454, 456 is configured to receive a corresponding switching signal, $q_{IC1}$, $q_{IC2}$, $q_{IC3}$, $q_{IC4}$, from the input converter controller 310 to control operation of the input converter 300. That is, inverter circuit 400 is configured to convert the DC waveform from the DC source 104 to a first AC waveform based on the switching signals received from the input converter controller 310. In the illustrative embodiment, the inverter circuit 400 is a embodied as a full-bridge circuit, but other circuit topologies such as a half-bridge circuit may be used in other embodiments. Additionally, although each of the switches 450, 452, 454, 456 is illustrated as MOSFET devices, other types of switches may be used in other embodiments.

The transformer 402 may be embodied as a two or more winding transformer having a primary winding electrically coupled to the inverter circuit 400 and a secondary winding coupled to the rectifier 404. The transformer 402 is configured to convert the first AC waveform supplied by the inverter circuit 400 at the primary winding to a second AC waveform at the secondary winding. The first and second AC waveforms may have substantially equal frequency and may or may not have substantially equal voltages. The illustrative transformer 402 includes a primary winding 460 electrically coupled to the inverter circuit 400 and a secondary winding 462 electrically coupled to the rectifier circuit 404. The transformer 402 provides galvanic isolation between the primary side converter circuitry (including DC source 104) and the secondary side circuitry (including the DC bus 304). The turns ratio of the transformer 402 may also provide voltage and current transformation between the first AC waveform at the primary winding 460 and the second AC waveform at the secondary winding 462.

The rectifier circuit 404 is electrically coupled to the secondary winding 462 of the transformer 402 and is configured to rectify the second AC waveform to a DC waveform supplied to the DC bus 304. In the illustrative embodiment, the rectifier 404 is embodied as a full-bridge rectifier formed from a plurality of diodes 470, 472, 474, 476. Again, in other embodiments, other circuit topologies may be used in the rectifier circuit 404.

The DC bus 304 is coupled to the rectifier circuit 404 of the input converter 300 and to the output converter 302. The DC bus 304 is configured to store energy from the input converter 300 and transfer energy to the output converter 302 as needed. To do so, the DC bus 304 is maintained at a high voltage DC value and includes a DC bus capacitor 480. The particular value of capacitance of the DC bus capacitor 480 is dependent on the particular parameters of the inverter 106 such as the desired voltage level of the DC bus 304, the expected requirements of the AC grid 102, and or the like.

The output converter 302 is electrically coupled to the DC bus 304 and configured to convert the DC bus waveform to the output waveform, which is filtered by the output filter 318. The illustrative output converter 302 includes a DC-to-AC inverter circuit 500 configured to convert the DC waveform supplied by the DC bus 304 to an output waveform delivered to the output filter 318. For example, the inverter circuit 500 is illustrative embodied as a bridge circuit formed by a plurality of switches 502, 504, 506, 508. Each of the switches 502, 504, 506, 508 is configured to receive a corresponding switching signal, $q_{OC1}$, $q_{OC2}$, $q_{OC3}$, $q_{OC4}$, from the output converter controller 312 to control operation of the inverter 106. As discussed above, output converter controller 312 is configured to operate the output converter 302 in a normal run mode or a pulse mode. Again, it should be appreciated that although the illustrative the output converter 302 is embodied as a full-bridge circuit, other circuit topologies such as a half-bridge circuit may be used in other embodiments. Additionally, although each of the switches 502, 504, 506, 508 is illustrated as MOSFET devices, other types of switches may be used in other embodiments.

The input filter 316 and output filter 318 are configured to provide filtering functions of the DC input waveform from the DC source 104 and the output waveforms to the AC grid 102, respectively. The input filter 316 illustratively includes a filtering capacitor 490 and a filtering inductor 492. However, other filtering components and topologies may be used in other embodiments. The output filter 318 is configured to filter the output voltage by reducing the conducted interference and satisfying regulatory requirements. In the illustrative embodiment, the output filter 318 includes differential-mode inductors 520, 522, a line filter capacitor 524, and common-mode inductors 526, 528. Again, however, other filtering component and topologies may be used in other embodiments.

Figure 6:
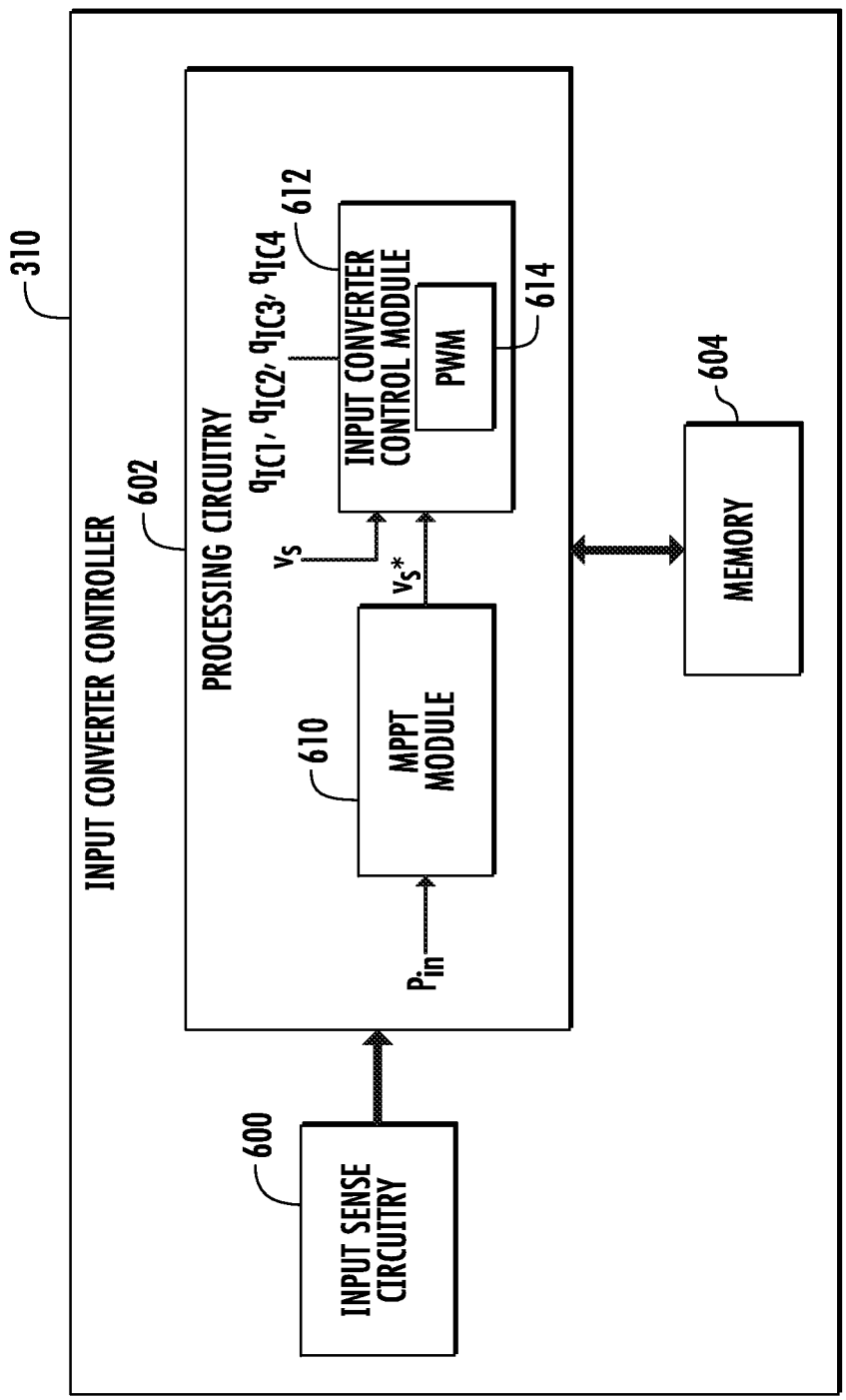
FIG. 6 is a simplified block diagram of one embodiment of an input converter controller of the inverter of FIG. 3.

Referring now to FIG. 6, one illustrative embodiment of the input converter controller 310 is shown. As discussed above, the input converter controller 310 controls the operation of the input converter 300. Illustratively, the input converter controller 310 includes input sense circuitry 600, processing circuitry 602, and memory 604. Of course, it should be appreciated that the input converter controller 310 may include other devices and/or circuitry in other embodiments. The input sense circuitry 600 includes a plurality of sensing circuits to sense various currents and voltages of the inverter 106. In the illustrative embodiment, the input sense circuitry 600 is configured to sense the output voltage of the DC source 104, the output current of the DC source 104, and the voltage of the DC power bus 304. However, in other embodiments, additional or other currents, voltages, and/or circuit characteristics may be sensed or otherwise measured by the input sense circuitry 600.

The processing circuit 602 may be embodied as any type of processing circuitry capable of performing the functions described herein. For example, the processing circuit 602 may be embodied as one or digital signal processors, microprocessors, microcontrollers, or the like. Such processors may have one or more processing cores. Similarly, the memory 604 may be embodied as one or more memory device or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory 604 is illustrated in FIG. 6, it should be appreciated that the input converter controller 310 may include additional memory devices in some embodiments.

The processing circuitry 602 includes a plurality of control modules, which may be embodied as firmware/software programs (e.g., stored in the memory 604), discrete hardware circuitry, and/or a combination of hardware and software. In the illustrative embodiment, the processing circuitry 602 includes an MPPT control module 610 and an input converter control module 612. Of course, it should be appreciated that additional or other modules, functionality, and features may be included in the processing circuitry 602 depending on the particular implementation.

The MPPT control module 610 provides maximum power point tracking of the DC power source 104. To do so, the MPPT control module 610 is configured to sense, receive, or otherwise calculate the input power, $P_{IN}$, supplied by the DC power source 104. The MPPT control module 610 may be configured to directly sense the input power, $P_{IN}$, or to derive the input power, $P_{IN}$, based on other signals such as the voltage, $V_S$, or current, $I_S$, of the DC power source 104. Additionally, it should be appreciated that in other embodiments, the MPPT control module 610 may receive additional input signals.

In use, the MPPT control module 610 generates a command signal based on the input power, $P_{IN}$, of the DC power source 104. In the illustrative embodiment, the command signal is embodied as a reference voltage command signal, $V_S^*$. However, in other embodiments, the command signal generated by the MPPT control module 610 may be embodied as other types of command signals such as a reference current command signal, a reference impedance command signal, a reference duty ratio command signal, or the like. The MPPT control module 610 supplies the voltage command signal, $V_S^*$, to the input converter control module 612.

As discussed above, the input converter control module 612 controls the operation of the input converter 300. To do so, the input converter control module 612 generates a plurality of switching signals, $q_x$, to control a plurality of switches of the input converter 300. In the illustrative embodiment, the input converter control module 612 utilizes a pulse width modulation (PWM) control module 614 to generate the control signals, $q_{IC1}$, $q_{IC2}$, $q_{IC3}$, $q_{IC4}$, based on a plurality of inputs including the voltage command signal, $V_S^*$, and a feedback signal of the input voltage of the DC power source 104, $V_S$. As a function of the control signals, $q_{IC1}$, $q_{IC2}$, $q_{IC3}$, $q_{IC4}$, the power point of the DC power source 104 is adjusted, which in turn modifies the input power, $P_{IN}$, generated by the DC power source 104. The input converter control module 612 may also perform various safety and/or quality verification checks on the input converter 400 such as ensuring that the input voltage to the input converter 400 and the voltage of the power bus 304 are within predetermined ranges.

Figure 7:
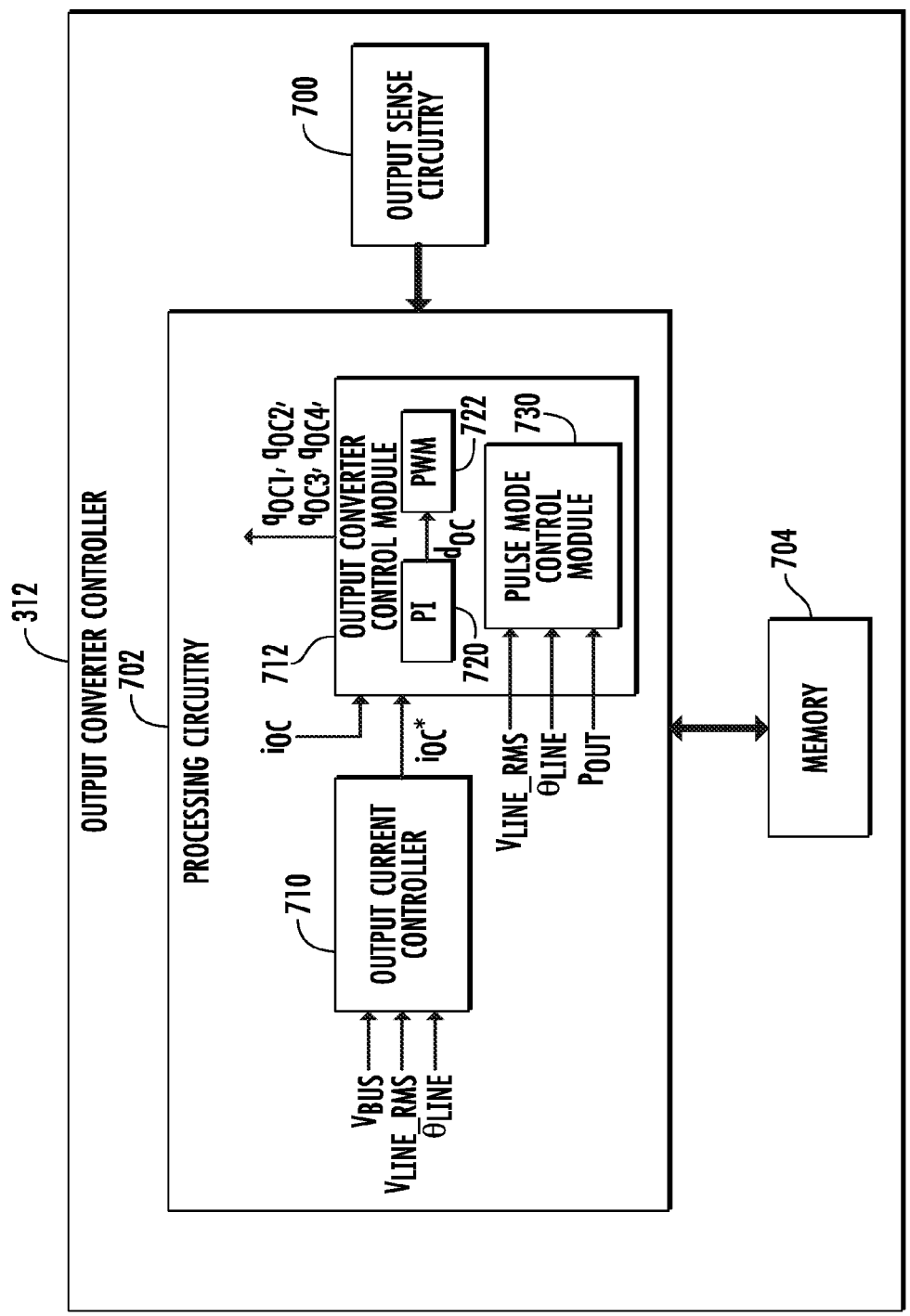
FIG. 7 is a simplified block diagram of one embodiment of an output converter controller of the inverter of FIG. 3.

Referring now to FIG. 7, one illustrative embodiment of the output converter controller 312 is shown. As discussed above, the output converter controller 312 controls the operation of the output converter 302. Illustratively, the output converter controller 312 includes output sense circuitry 700, processing circuitry 702, and memory 704. Of course, it should be appreciated that the output converter controller 312 may include other devices and/or circuitry in other embodiments. The input sense circuitry 700 includes a plurality of sensing circuits to sense various currents and voltages of the inverter 106 and/or AC grid 102. In the illustrative embodiment, the output sense circuitry 700 is configured to sense or calculate the grid line voltage, $V_{LINE\_RMS}$, the grid phase, $\theta_{LINE}$, and the output power of the inverter 106, $P_{OUT}$. However, in other embodiments, additional or other currents, voltages, and/or circuit characteristics may be sensed or otherwise measured by the input sense circuitry 600.

Similar to the processing circuit 602 of the input converter controller 310, the processing circuit 702 may be embodied as any type of processing circuitry capable of performing the functions described herein. For example, the processing circuit 702 may be embodied as one or digital signal processors, microprocessors, microcontrollers, or the like. Such processors may have one or more processing cores. Similarly, the memory 704 may be embodied as one or more memory device or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory 704 is illustrated in FIG. 7, it should be appreciated that the output converter controller 312 may include additional memory devices in some embodiments.

The processing circuitry 702 includes a plurality of control modules, which may be embodied as firmware/software programs (e.g., stored in the memory 704), discrete hardware circuitry, and/or a combination of hardware and software. In the illustrative embodiment, the processing circuitry 702 includes an output current controller 710 and an output converter control module 712. Of course, it should be appreciated that additional or other modules, functionality, and features may be included in the processing circuitry 702 depending on the particular implementation. Additionally, it should be appreciated that although the modules 710, 712 are illustrated in FIG. 7 as separate modules, the functionality of any one or more of the modules 710, 712 may be incorporated into another module of the processing circuitry 702.

The output current controller 710 is configured to generate a command signal as a function of a plurality of other signals and/or characteristics of the inverter 106. For example [le, in the illustrative embodiment, the output current controller 710 generates a current command signal, $i_{OC}*$, as a function of the voltage of the DC power bus 304, $V_{BUS}$, the average grid line voltage, $V_{LINE\_RMS}$, and the phase angle of the grid voltage, $\theta_{LINE}$. Of course, in other embodiments, the output current controller 710 may generate the current command signal based on additional or other signals of the inverter 106. Additionally, although the command signal is embodied as a current command signal in FIG. 7, the command signal may be embodied as a voltage command signal, a duty cycle command signal, or another type of command signal in other embodiments.

The output converter control module 712 is configured to control the operation of the output converter 302. To do so, the output converter control module 712 is configured to generate the plurality of output switching signals, $q_{OC1}$, $q_{OC2}$, $q_{OC3}$, $q_{OC4}$, that control the operation of the switches 502, 504, 506, 508 of the output converter 302. In the illustrative embodiment, the output converter control module 712 includes a proportional-integral (PI) module 720 that generates a duty cycle command signal, $d_{OC}$, based on the current command signal, $i_{OC}*$, and a feedback signal of the output current of the inverter 106, $i_{OC}$. The duty cycle command signal, $d_{OC}$, is provided to a pulse width modulation (PWM) control module 722, which generates the output switching signals, $q_{OC1}$, $q_{OC2}$, $q_{OC3}$, $q_{OC4}$, based on the duty cycle command signal, $d_{OC}$. The output converter control module 712 may also perform various safety and/or quality verification checks on the inverter 106 such as ensuring that the output power remains within an acceptable range, protecting against anti-islanding conditions, and/or other functions.

The output converter control module 712 also includes a pulse mode control module 730, which is configured to control or operate the output converter 302 in a normal run mode or a pulse mode based on one or more criteria. When operating in the normal run mode, the output converter control module 712 controls the output converter 302 (via the output switching signals $q_{OC1}$, $q_{OC2}$, $q_{OC3}$, $q_{OC4}$) to produce a full-cycle sinusoidal output waveform. However, when operating in the pulse mode, the output converter control module 712 controls the output converter 302 to produce a sinusoidal pulse output waveform having a particular pulse width (see FIG. 9). The sinusoidal pulse output waveform may be generated via control of the output switching signals, $q_{OC1}$, $q_{OC2}$, $q_{OC3}$, $q_{OC4}$, or via control of additional switches or circuitry within the output converter 302 that are operable to shape the output waveform.

As discussed in more detail below, the pulse mode control module 730 may select the particular operation mode based on one or more criteria such as, for example, the output power of the inverter 106. Additionally, the shape of the sinusoidal pulse output waveform may be based on one or more signals and/or operating characteristics of the inverter 106. For example, in some embodiments as discussed in more detail below, the pulse width of the sinusoidal pulse output waveform may be determined based on the power output of the inverter 106, the grid voltage level, and/or other criteria. Additionally, the amplitude of the sinusoidal pulse output waveform may be dependent upon the voltage level of the DC power bus 304 (i.e., the amplitude may be selected so as to maintain the DC power bus 304 at a reference voltage level).

Of course, it should be appreciated that the pulse mode control module 730 may use additional or other circuit signals and characteristics in other embodiments to control the operation of the output converter 302.

Figure 8:
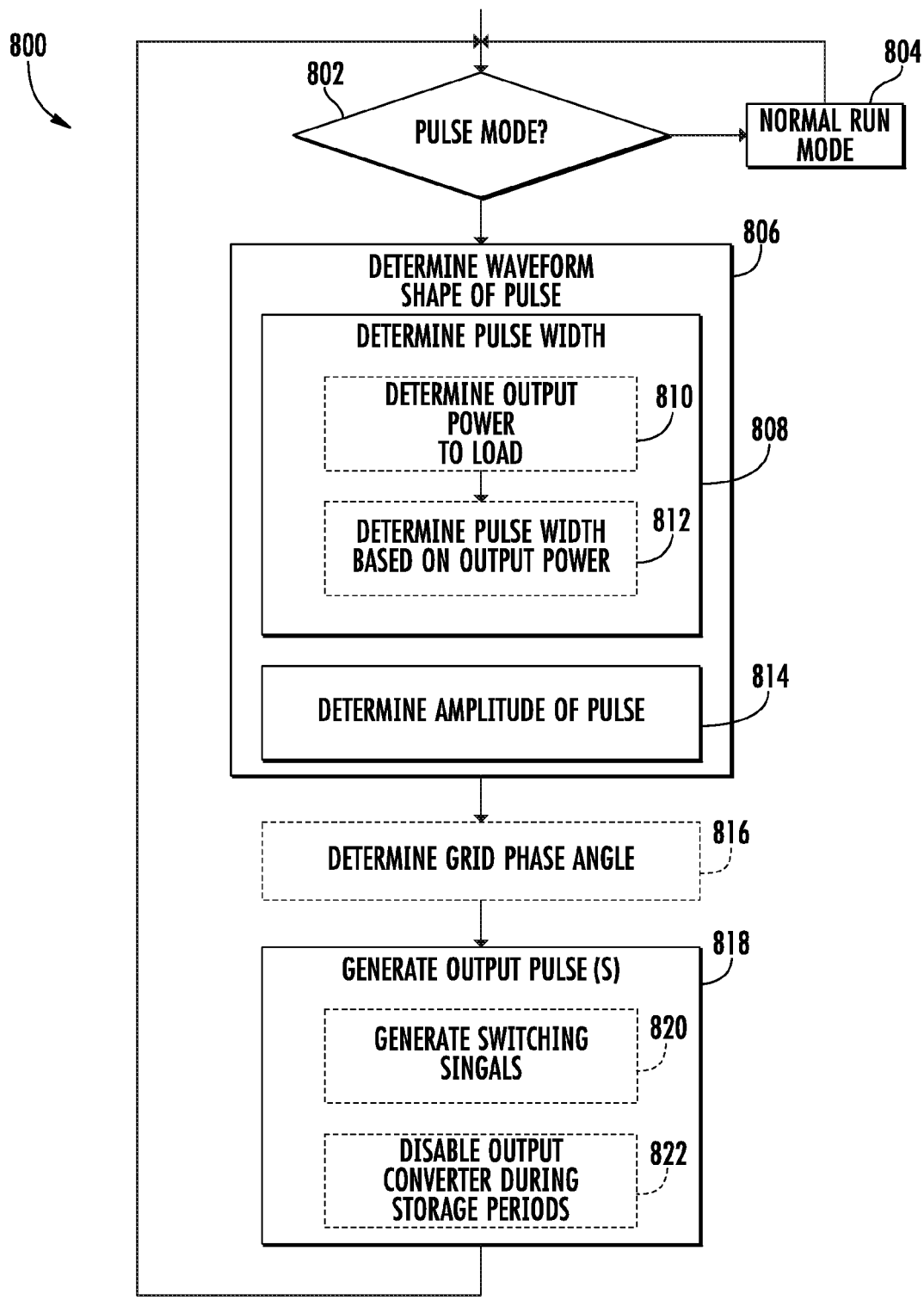
FIG. 8 is a simplified flow diagram of one embodiment of a pulse mode control method that may be executed by the output converter of FIG. 7.

As discussed above, the output converter controller 312 is configured to control the operation of the output converter 302 to operate in a normal run mode or a pulse mode. To do so, the output converter controller 312 may execute a pulse mode control method 800 as shown in FIG. 8. The method 800 begins with block 802 in which the output converter controller 312 determines whether the inverter 106 (i.e., the output converter 302) should be operated in pulse mode. The output converter controller 312 may use any criteria to determine whether to operate in pulse mode. For example, in some embodiments, the output converter controller 312 may determine to operate in pulse mode based on the output power of the inverter 106. For example, the output converter controller 312 may be configured to compare the output power of the inverter 106 to a reference threshold and execute pulse mode in response to the output power of the inverter 106 being less than the reference power threshold. In this way, pulse mode is executed when the inverter 106 is operating at low output power (e.g., 30% full power capacity or lower).

If the output converter controller 312 determines pulse mode is not required or desirable (e.g., the inverter 106 is operating a high output power), the method 800 advances in block 804 in which the output converter controller 312 controls the output converter 302 to operate in a normal run mode. In the normal run mode, the output converter 302 is configured to generate a sinusoidal output waveform. In embodiments wherein the inverter 106 is connected to the AC grid 102, the output converter 302 is configured to generate a sinusoidal output waveform (e.g., a sinusoidal output current waveform) at the grid frequency of the AC grid 102 and in phase with a grid waveform of the AC grid.

Figure 9:
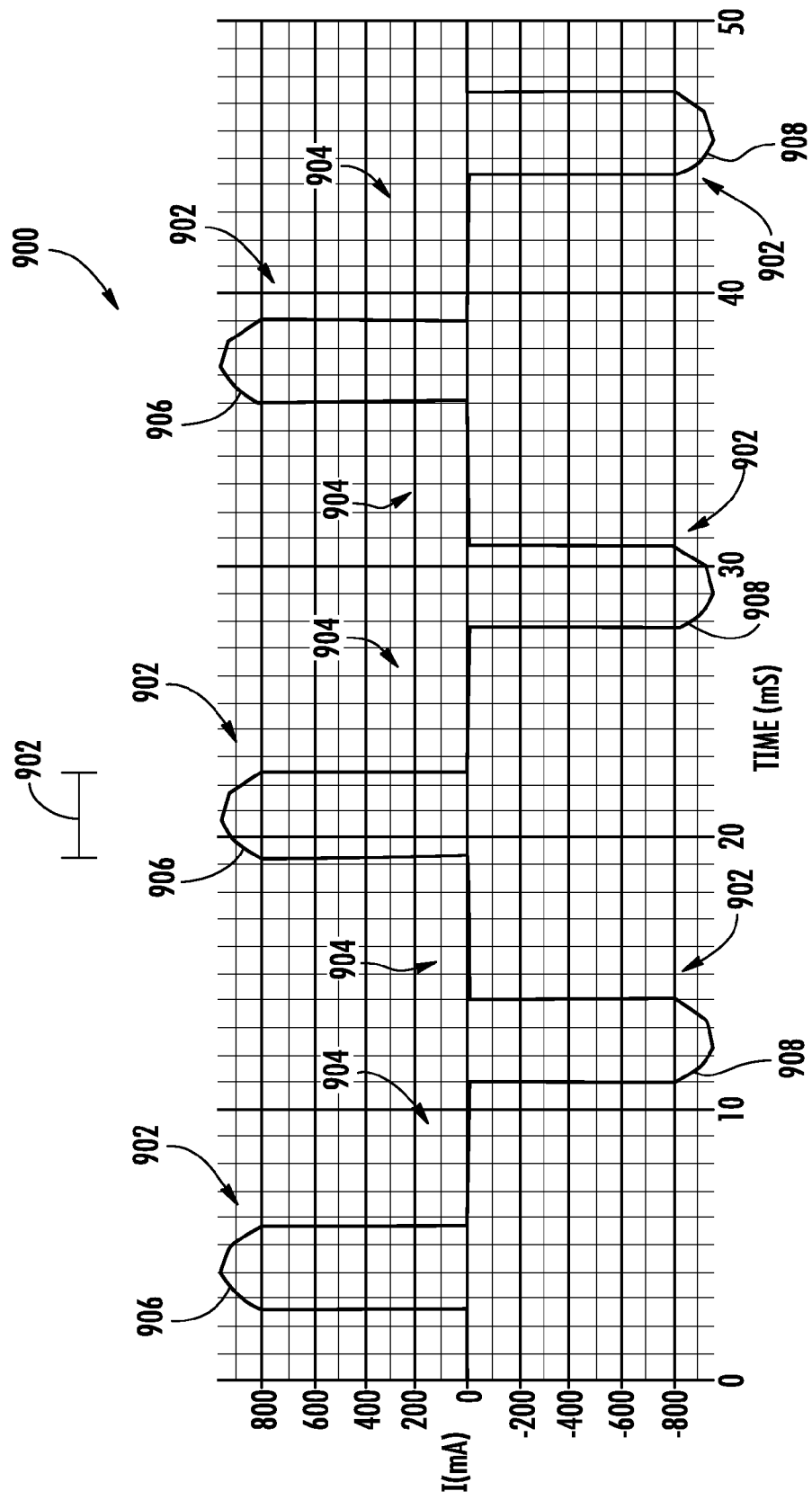
FIG. 9 is a simulated waveform of a current output of the inverter of FIG. 3 during execution of the pulse mode control method of FIG. 8.
Figure 13:
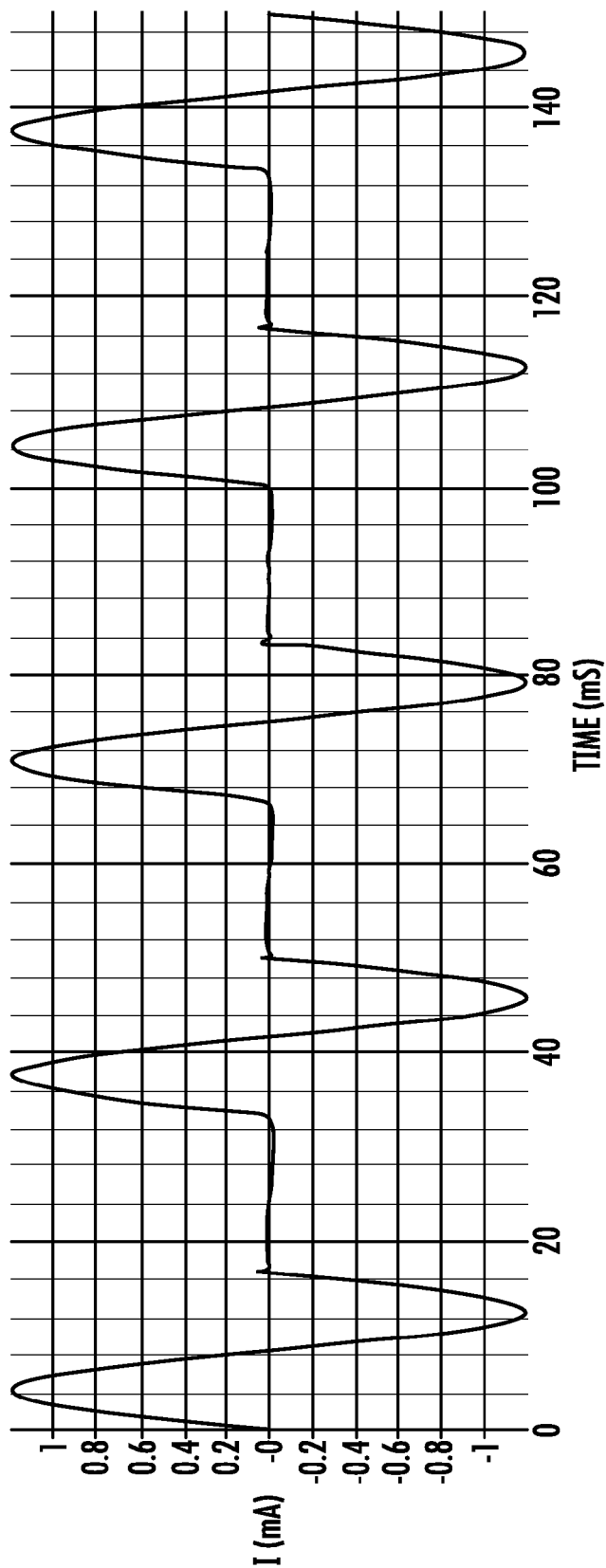
FIG. 13 is a simulated waveform of a current output of a typical inverter using a burst mode.

If, however, the output converter controller 312 determines to operate in pulse mode, the output converter 302 is controlled to generate a sinusoidal pulse output waveform. An illustrative sinusoidal pulse output waveform 900 is shown in FIG. 9. The sinusoidal pulse output waveform 900 comprises a plurality of pulse periods 902, during which a positive pulse 906 or a negative pulse 908 is generated, separated by storage periods 904 during which the output converter 302 is "turned off" (i.e., no output is generated from the output converter 302) and energy is stored in the DC bus 304 for the next pulse. However, unlike a traditional "burst mode" techniques and resultant waveforms (see FIG. 13), the output converter 302 does not generate full-cycle sinusoidal waveforms. Rather, the output converter 302 is "turned on" only for a time duration (i.e., during the pulse periods 902) during which the sinusoidal output waveform of the converter 302 is near peak output.

Figure 10:
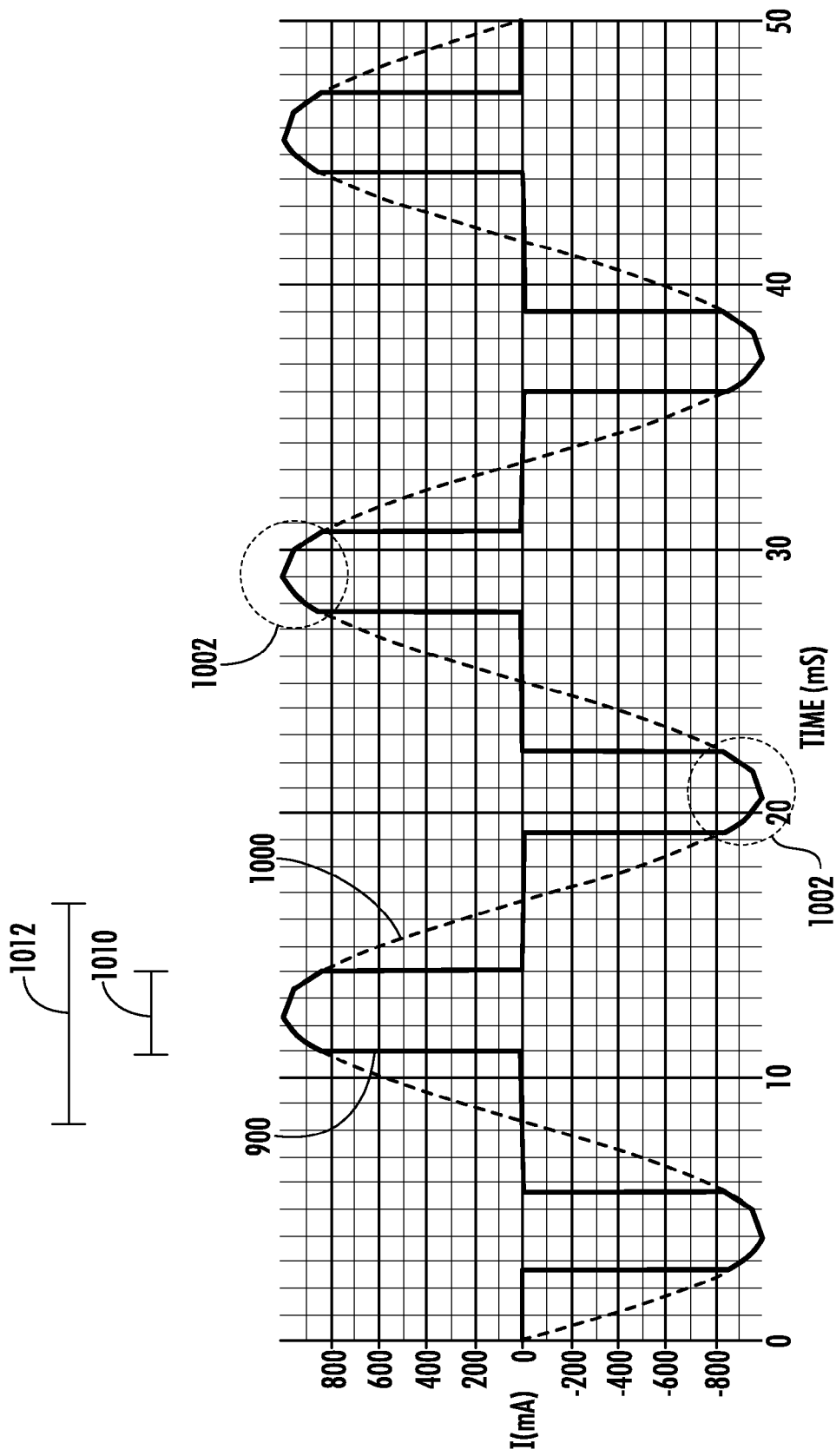
FIG. 10 is a waveform diagram showing the simulated current waveform of FIG. 9 superimposed over a simulated waveform of a current output of the inverter of FIG. 3 during a normal run mode.

For example, the sinusoidal pulse output waveform 900 generated by the output converter 302 during pulse mode operation is superimposed over a normal sinusoidal output waveform 1000 generated by the output converter 302 during normal run mode in FIG. 10. As shown in FIG. 10, the output of the converter 302 is clipped or otherwise turned off except for the time duration during which the output of the output converter 302 is near peak values (i.e., the pulse periods 902 are centered on the peaks of the output). During the pulse periods 902, the output converter 302 is "turned on" and generates a sinusoidal-like output that is substantially similar to the normal sinusoidal output waveform 1000 during that pulse period as indicated in FIG. 10 by peak areas 1002. As such, the resulting output pulse can be defined by an offset sinusoidal equation. However, it should be appreciated that the sinusoidal pulse output waveform 900 is not a full-cycle sinusoidal waveform as the output of the converter 302 is clipped to substantially zero for all times outside the pulse window (i.e., during storage periods 904).

Referring back to FIG. 8, if pulse mode is enabled in block 802, the method 800 advances to block 806 in which the output converter controller 312 determines the shape of the output pulse. To do so, the output converter controller 312 determines a pulse width 1010 (i.e., the duration of the output pulse 906, 908) in block 808. As shown in FIG. 10, the pulse width 1010 may be selected or otherwise set to any value less than the half-cycle period 1012 of the normal sinusoidal output waveform 1000. For example, if the output converter 302 is set to generate a 60 Hertz sinusoidal waveform, the pulse width 1010 for the pulse mode may be set to any value substantially less than about 8.333 milliseconds. The pulse width 1010 may be set to a fixed, predetermined amount or determined based on one or more criterion. For example, in some embodiments, the pulse width may be set to a fixed amount (e.g., a fixed time duration), set to a fixed percentage of the half-cycle period 1012 (e.g., 30%), or the like.

Additionally or alternatively, the pulse width 1010 may be based on one or more signals or operation characteristics of the inverter 106. For example, in some embodiments, the pulse width 1010 may be based on or otherwise a function of the output power of the inverter 106 (i.e., the power drawn by the AC grid 102 or load connected to the inverter 106). In such embodiments, the output converter controller 312 is configured to sense or otherwise determine the output power of the output converter 302 in block 810 and determine the pulse width 1010 based on the output power in block 812. To do so, the output converter controller 312 may use an equation or other mathematical relationship to determine the pulse width 1010 as a function of the output power of the inverter 106. Alternatively, in some embodiments, a data table that correlates output power of the inverter 106 to pulse width 1010 may be stored in the memory 704 of the output converter controller 312. In such embodiments, the output converter controller 312 may be configured to access the data table to determine the pulse width 1010 for the particular power output level of the inverter 106. Of course, it should be appreciated that the pulse width 1010 may be determined based on or as a function of other signals and/or operating characteristics of the inverter 106 in other embodiments. For example, in some embodiments, the pulse width 1010 may be determined as a function of the grid voltage of the AC grid 102, the input power of the DC source 104, the voltage of the DC bus 304, and/or other signals and/or circuit characteristics.

In block 814, the output converter controller 312 determines the amplitude of the pulses 906, 908. The amplitude of the pulses 906, 908 may be set to a fixed value or may be based on one or more signals or operating characteristics of the inverter 106. For example, in some embodiments, the amplitude of the pulses 906, 908 is based on or otherwise a function of the bus voltage of the DC bus 304. That is, the amplitude is of the pulses 906, 908 is selected so as to maintain the bus voltage of the DC bus 304 at a reference voltage level.

As discussed above, the inverter 106 may be connected to the AC grid 102 in some embodiments. In such embodiments, the output converter controller 312 is configured to determine the phase of a grid waveform of the AC grid 102 in block 816. For example, in some embodiments, the output converter controller 312 may be configured to determine the phase of the grid voltage of the AC grid in block 816. To do so, the output converter controller 312 may utilize a phase lock loop (PLL) circuit or other phase-determination circuit or methodology.

In block 818, the output converter controller 312 controls the output converter 302 to generate the sinusoidal pulse output waveform 900. To do so, in some embodiments, the output converter controller 312 is configured to generate the output switching signals, $q_{OC1}$, $q_{OC2}$, $q_{OC3}$, $q_{OC4}$, to control the switches, 502, 504, 506, 508, of the output converter 302 in such a manner as to produce the sinusoidal pulse output waveform 900 in block 820. Additionally or alternatively, the output converter controller 312 may be configured to "turn off" the output converter 302 during the storage periods 904 in block 822 (e.g., the output converter controller 312 may control operation of a switch to interrupt the power received from the DC bus 304). In embodiments wherein the inverter 106 is connected to the AC grid 102, the output converter controller 312 is configured to generate the sinusoidal pulse output waveform in phase with a waveform (e.g., the grid voltage waveform) of the AC grid. 102. The output converter controller 312 may continue to control the output converter 302 to generate the sinusoidal pulse output waveform until the controller 312 determines that normal run mode should be executed.

Figure 11:
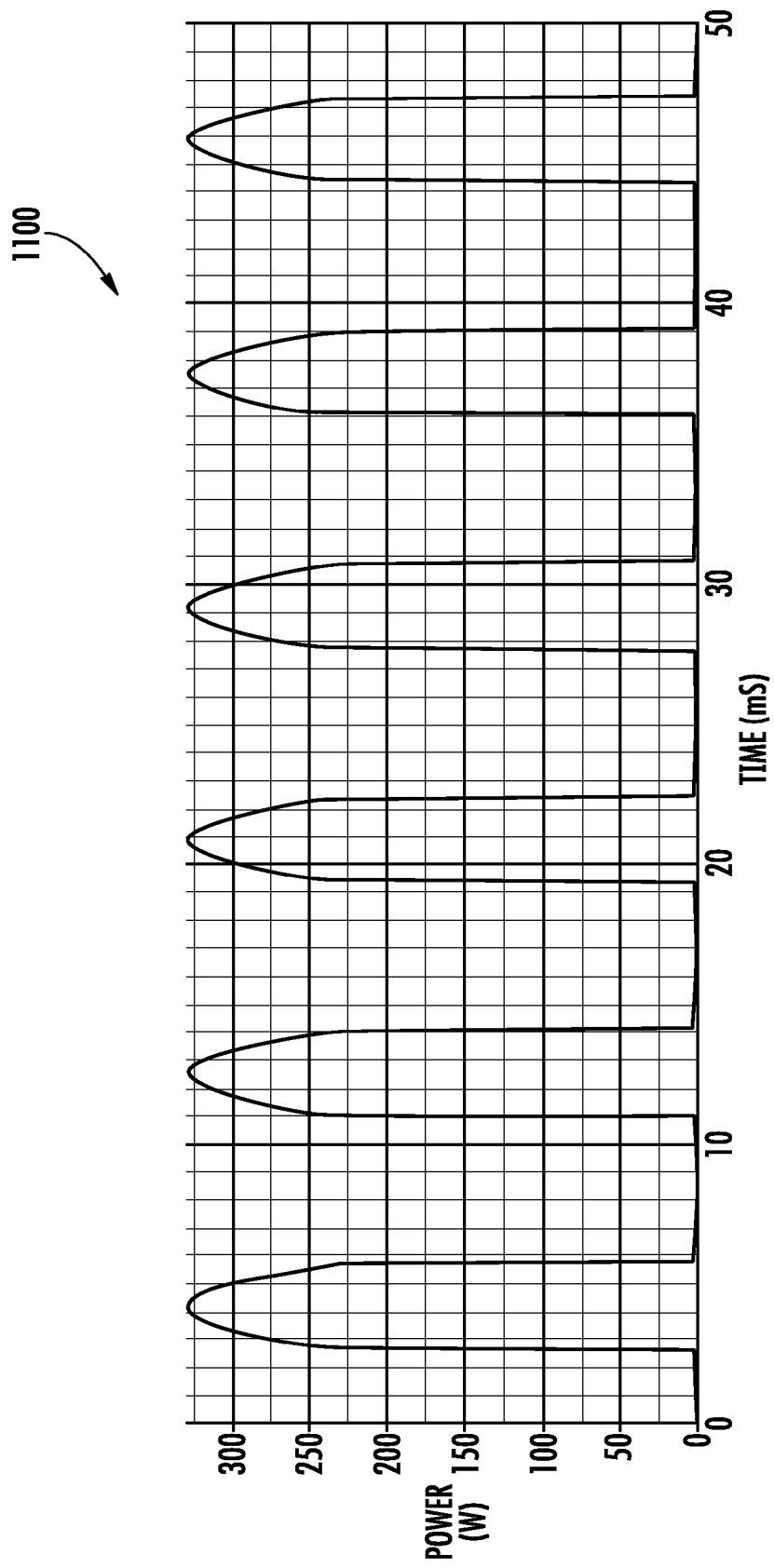
FIG. 11 is a simulated waveform of a power output of the inverter of FIG. 3 during execution of the pulse mode control method of FIG. 8.
Figure 12:
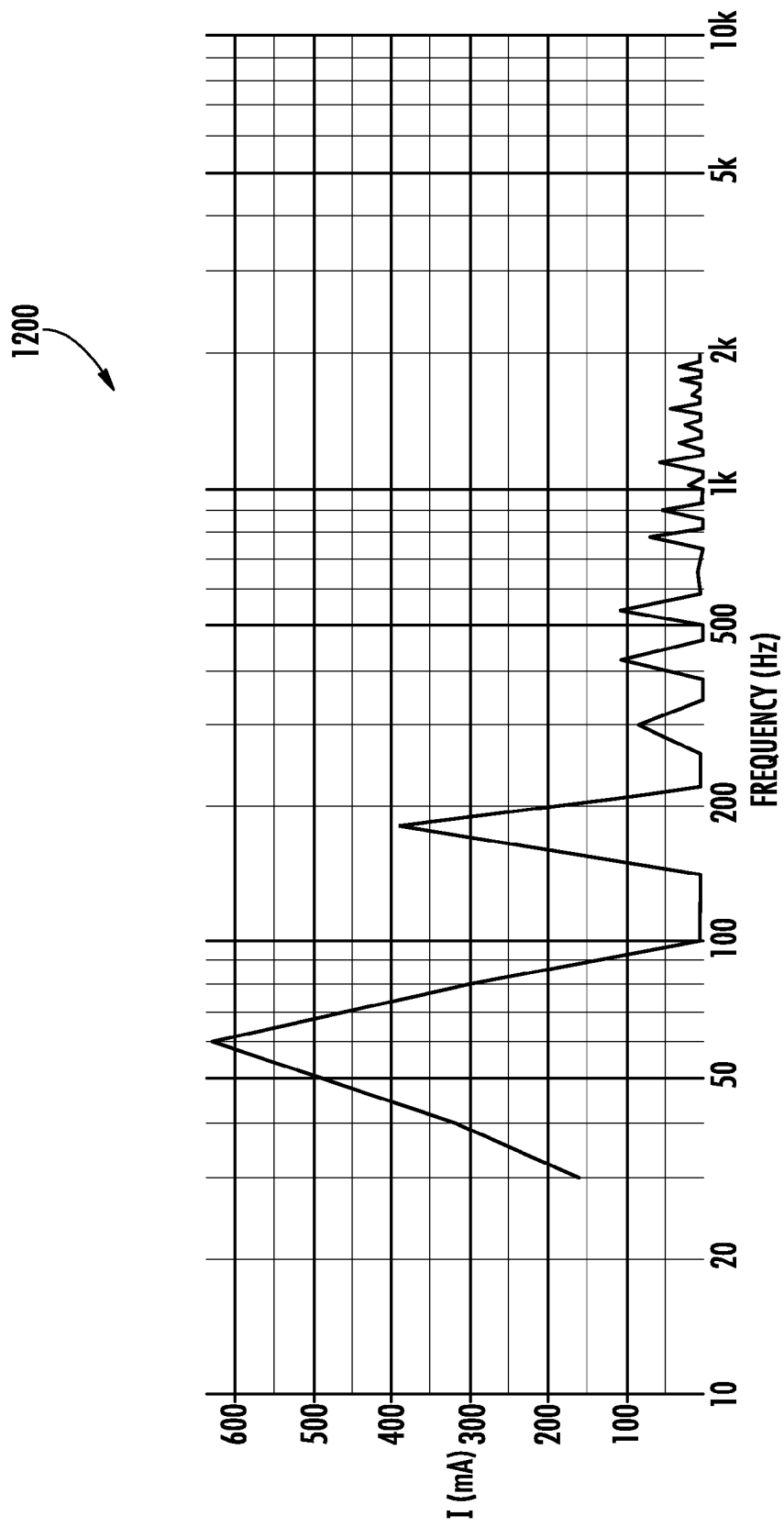
FIG. 12 is a simulated frequency spectrum diagram of the current output of the inverter of FIG. 3 during execution of the pulse mode control method of FIG. 8.

In this way, the inverter 106 is configured to operate in a normal run mode in which the sinusoidal output waveform 1000 is generated or a pulse mode in which the sinusoidal pulse output waveform 900 is generated. When operating in the pulse mode, the sinusoidal output waveform 1000 concentrates the output power in shorter durations of time. For example, a simulated power output of the inverter 106 generating the sinusoidal pulse output waveform 900 is shown in FIG. 11. Assuming the power from the inverter 106 is being delivered to a 240-VAC, 60 Hz grid, the average power generated by the inverter 106 is about 108 W (compared to about 170 W for the sinusoidal output waveform 1000). As such, about 64% of the total power (108 W/170 W) is concentrated into 3 milliseconds of each half period (8.33 milliseconds). Additionally, the sinusoidal pulse output waveform 900 generates fewer or no sub-harmonics compared to a standard sinusoidal output waveform. For example, as shown in FIG. 12, the sinusoidal pulse output waveform 900 at 60 Hertz has a frequency spectrum 1200 having no or a reduced sub-harmonic at 30 Hertz or lower. Such reduction of sub-harmonics and concentration of power output may improve the overall efficiency and/or operation of the inverter 106.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. A method for controlling a photovoltaic module inverter, the method comprising:
   determining whether to operate the photovoltaic module inverter in a sinusoidal pulse mode; and
   generating, in response to determining to operate the photovoltaic module inverter in a sinusoidal pulse mode, a sinusoidal output pulse waveform at an output of the photovoltaic module inverter, the sinusoidal output pulse waveform comprising a plurality of pulse periods in which a positive pulse and a negative pulse are generated, wherein each corresponding positive pulse and negative pulse is separated from each other by a storage period in which substantially no output power is delivered by the photovoltaic module inverter.

2. The method of claim 1, wherein determining whether to operate the photovoltaic module in a sinusoidal pulse mode comprises:
comparing an output power of the photovoltaic module inverter to a reference output power; and
determining to operate the photovoltaic module inverter in the sinusoidal pulse mode in response to the output power of the photovoltaic module inverter being less than the reference output power.

3. The method of claim 1, further comprising turning off an output converter of the photovoltaic module during the storage periods of the sinusoidal output pulse waveform.

4. The method of claim 1, further comprising:
determining an output frequency of the photovoltaic module inverter; and
determining a pulse width value for the sinusoidal output pulse waveform, the pulse width value being less than a half-wave period of a full-cycle sinusoidal waveform at the output frequency,
wherein each positive pulse and each negative pulse of the plurality of pulse periods has a pulse width equal to the pulse width value.

5. The method of claim 4, wherein determining the output frequency of the photovoltaic module inverter comprises setting the output frequency substantially equal to a grid frequency of a power grid to which the photovoltaic module inverter is connected.

6. The method of claim 4, wherein determining the pulse width value comprises determining a pulse width value for the sinusoidal output pulse waveform as a function of an output power of the photovoltaic module inverter.

7. The method of claim 1, wherein generating the sinusoidal output pulse waveform comprises generating switching signals to an output converter of the photovoltaic module inverter only for a duration equal to a pulse width of each of the positive pulses and the negative pulses.

8. The method of claim 1, wherein:
each positive pulse of each pulse period is generated in phase with a positive half-cycle of a grid waveform of a power grid to which the photovoltaic module inverter is connected, and
each negative pulse of each pulse period is generated in phase with a negative half-cycle of the grid waveform of the power grid.

9. A photovoltaic module inverter comprising:
an output converter to generate a sinusoidal output pulse waveform at an output of the photovoltaic module inverter; and
an output converter controller coupled to the output converter and configured to:
(i) determine whether to operate the output converter in a sinusoidal pulse mode, and
(ii) control the output converter, in response to a determination to operate the output converter in the sinusoidal pulse mode, to generate the sinusoidal output pulse waveform, wherein the sinusoidal output pulse waveform comprises a plurality of pulse periods, each pulse period comprising a positive pulse separated from a negative pulse by a storage period in which substantially no output power is delivered by the photovoltaic module inverter.

10. The photovoltaic module inverter of claim 9, wherein the output converter controller is configured to:
compare an output power of the photovoltaic module inverter to a reference output power; and
determine to operate the output converter in the sinusoidal pulse mode in response to a determination that the output power of the photovoltaic module inverter is less than the reference output power.

11. The photovoltaic module inverter of claim 9, wherein the output converter controller is further configured to turn off the output converter during the storage periods of the sinusoidal output pulse waveform.

12. The photovoltaic module inverter of claim 9, wherein the output converter controller is further configured to:
determine an output frequency of the photovoltaic module inverter; and
determine a pulse width value for the sinusoidal output pulse waveform, wherein the pulse width value is less than a half-wave period of a full-cycle sinusoidal waveform at the output frequency,
wherein each positive pulse and each negative pulse of the plurality of pulse periods has a pulse width equal to the pulse width value.

13. The photovoltaic module inverter of claim 12, wherein to determine the output frequency of the photovoltaic module inverter comprises to set the output frequency substantially equal to a grid frequency of a power grid to which the photovoltaic module inverter is connected.

14. The photovoltaic module inverter of claim 12, wherein to determine the pulse width value comprises to determine a pulse width value for the sinusoidal output pulse waveform as a function of an output power of the photovoltaic module inverter.

15. The photovoltaic module inverter of claim 9, wherein to control the output converter comprises to generate switching signals to the output converter only for a duration equal to a pulse width of each of the positive pulses and the negative pulses.

16. The photovoltaic module inverter of claim 9, wherein:
each positive pulse of each pulse period is generated in phase with a positive half-cycle of a grid waveform of a power grid to which the photovoltaic module inverter is connected, and
each negative pulse of each pulse period is generated in phase with a negative half-cycle of the grid waveform of the power grid.

17. One or more machine-readable media comprising a plurality of instructions stored therein, which when executed by an output converter controller of a photovoltaic module inverter, cause the output converter controller to:
determine whether to operate an output converter of the photovoltaic module inverter in a sinusoidal pulse mode; and
control the output converter, in response to a determination to operate the output converter in the sinusoidal pulse mode, to generate a sinusoidal output pulse waveform at an output of the photovoltaic module inverter, wherein the sinusoidal output pulse waveform comprises a plurality of pulse periods, each pulse period comprising a positive pulse separated from a negative pulse by a storage period in which substantially no output power is delivered by the photovoltaic module inverter.

18. The one or more machine-readable media of claim 17, wherein plurality of instructions, when executed by the output converter controller, cause the output converter controller to:
compare an output power of the photovoltaic module inverter to a reference output power; and
determine to operate the output converter in the sinusoidal pulse mode in response to a determination that the output power of the photovoltaic module inverter is less than the reference output power.

19. The one or more machine-readable media of claim 17, wherein plurality of instructions, when executed by the output converter controller, cause the output converter controller to:
- determine an output frequency of the photovoltaic module inverter; and
- determine a pulse width value for the sinusoidal output pulse waveform, wherein the pulse width value is less than a half-wave period of a full-cycle sinusoidal waveform at the output frequency,
- wherein each positive pulse and each negative pulse of the plurality of pulse periods has a pulse width equal to the pulse width value.

20. The one or more machine-readable media of claim 17, wherein:
- each positive pulse of each pulse period is generated in phase with a positive half-cycle of a grid waveform of a power grid to which the photovoltaic module inverter is connected, and
- each negative pulse of each pulse period is generated in phase with a negative half-cycle of the grid waveform of the power grid.

\* \* \* \* \*